US007155322B2

(12) United States Patent
Nakahara et al.

(10) Patent No.: US 7,155,322 B2
(45) Date of Patent: Dec. 26, 2006

(54) VEHICLE INFORMATION COLLECTION SYSTEM AND METHOD THEREOF

(75) Inventors: Takashi Nakahara, Hitachi (JP); Takeshi Inoue, Hitachi (JP); Takayoshi Yokota, Hitachiota (JP); Takumi Tushiki, Hitachi (JP); Kennichirou Yamane, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 2 days.

(21) Appl. No.: 10/668,312

(22) Filed: Sep. 24, 2003

(65) Prior Publication Data

US 2004/0064337 A1 Apr. 1, 2004

(30) Foreign Application Priority Data

Sep. 25, 2002 (JP) ............................ 2002-278313

(51) Int. Cl.
*G01M 17/00* (2006.01)

(52) U.S. Cl. ............................ 701/35; 701/29; 701/33; 340/439

(58) Field of Classification Search .................. 701/29, 701/32–33, 35, 117; 705/1, 5, 7–9, 13–14; 340/438–439, 988–990, 445; 455/414.1–414
See application file for complete search history.

(56) References Cited

U.S. PATENT DOCUMENTS

| | | | | |
|---|---|---|---|---|
| 4,404,639 | A * | 9/1983 | McGuire et al. | 701/35 |
| 5,995,898 | A | 11/1999 | Tuttle | 701/102 |
| 6,222,463 | B1 | 4/2001 | Rai | 340/988 |
| 6,240,365 | B1 | 5/2001 | Bunn | 701/213 |
| 6,707,421 | B1 * | 3/2004 | Drury et al. | 342/357.1 |
| 6,738,711 | B1 * | 5/2004 | Ohmura et al. | 701/208 |
| 6,754,570 | B1 * | 6/2004 | Iihoshi et al. | 701/33 |
| 6,823,258 | B1 * | 11/2004 | Ukai et al. | 701/207 |
| 6,828,936 | B1 * | 12/2004 | Odashima et al. | 342/455 |
| 6,859,699 | B1 * | 2/2005 | Carroll et al. | 701/33 |
| 2003/0040944 | A1 * | 2/2003 | Hileman | 705/5 |
| 2003/0111525 | A1 * | 6/2003 | Sweeney et al. | 235/376 |
| 2003/0163248 | A1 * | 8/2003 | Mizuishi | 701/117 |
| 2004/0204795 | A1 * | 10/2004 | Harvey et al. | 701/1 |
| 2005/0027608 | A1 * | 2/2005 | Wiesmuller et al. | 705/26 |

FOREIGN PATENT DOCUMENTS

| | | |
|---|---|---|
| JP | 05-332888 | 6/1992 |
| JP | 11-345388 | 6/1998 |
| JP | 2000-171267 | 12/1998 |
| JP | 11-511581 | 5/1999 |
| JP | 2001-298397 | 4/2000 |
| JP | 2002-123881 | 10/2000 |
| JP | 2002-251698 | 2/2001 |
| JP | 2002-370630 | 6/2001 |

* cited by examiner

*Primary Examiner*—Gertrude A. Jeanglaude
(74) *Attorney, Agent, or Firm*—Crowell & Moring LLP

(57) ABSTRACT

A vehicle information specification determining function is built in the on-board terminal installed on a vehicle to determine the specification for vehicle information collection. An information center determines service charges according to the vehicle information specification determined by the vehicle information specification determining function.

7 Claims, 23 Drawing Sheets

FIG. 24

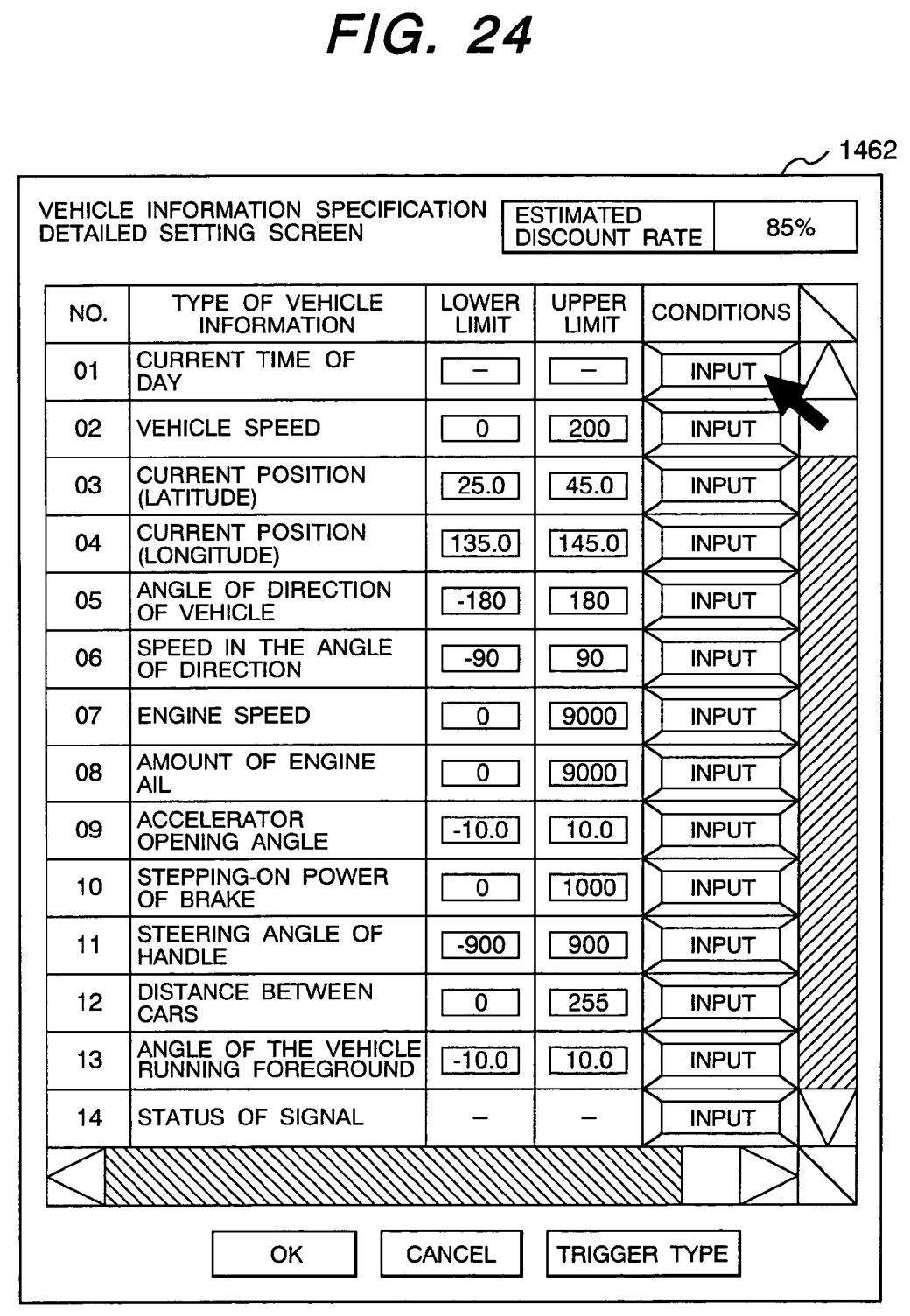

1462

VEHICLE INFORMATION SPECIFICATION DETAILED SETTING SCREEN

| ESTIMATED DISCOUNT RATE | 85% |
|---|---|

| NO. | TYPE OF VEHICLE INFORMATION | LOWER LIMIT | UPPER LIMIT | CONDITIONS |
|---|---|---|---|---|
| 01 | CURRENT TIME OF DAY | – | – | INPUT |
| 02 | VEHICLE SPEED | 0 | 200 | INPUT |
| 03 | CURRENT POSITION (LATITUDE) | 25.0 | 45.0 | INPUT |
| 04 | CURRENT POSITION (LONGITUDE) | 135.0 | 145.0 | INPUT |
| 05 | ANGLE OF DIRECTION OF VEHICLE | -180 | 180 | INPUT |
| 06 | SPEED IN THE ANGLE OF DIRECTION | -90 | 90 | INPUT |
| 07 | ENGINE SPEED | 0 | 9000 | INPUT |
| 08 | AMOUNT OF ENGINE AIL | 0 | 9000 | INPUT |
| 09 | ACCELERATOR OPENING ANGLE | -10.0 | 10.0 | INPUT |
| 10 | STEPPING-ON POWER OF BRAKE | 0 | 1000 | INPUT |
| 11 | STEERING ANGLE OF HANDLE | -900 | 900 | INPUT |
| 12 | DISTANCE BETWEEN CARS | 0 | 255 | INPUT |
| 13 | ANGLE OF THE VEHICLE RUNNING FOREGROUND | -10.0 | 10.0 | INPUT |
| 14 | STATUS OF SIGNAL | – | – | INPUT |

OK CANCEL TRIGGER TYPE

FIG. 25

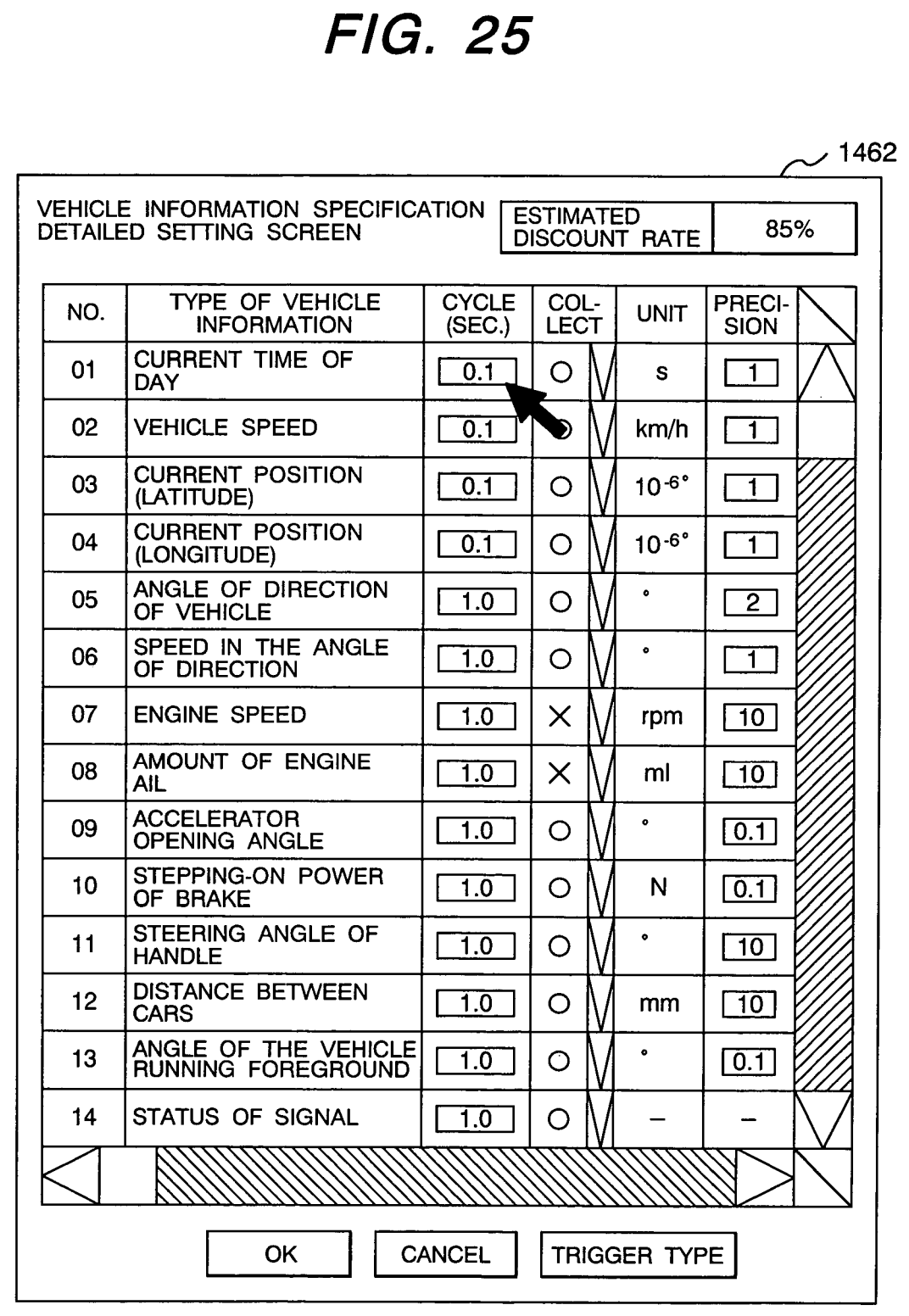

1462

VEHICLE INFORMATION SPECIFICATION DETAILED SETTING SCREEN

| ESTIMATED DISCOUNT RATE | 85% |
|---|---|

| NO. | TYPE OF VEHICLE INFORMATION | CYCLE (SEC.) | COL-LECT | UNIT | PRECI-SION |
|---|---|---|---|---|---|
| 01 | CURRENT TIME OF DAY | 0.1 | ○ | s | 1 |
| 02 | VEHICLE SPEED | 0.1 | ○ | km/h | 1 |
| 03 | CURRENT POSITION (LATITUDE) | 0.1 | ○ | $10^{-6}$° | 1 |
| 04 | CURRENT POSITION (LONGITUDE) | 0.1 | ○ | $10^{-6}$° | 1 |
| 05 | ANGLE OF DIRECTION OF VEHICLE | 1.0 | ○ | ° | 2 |
| 06 | SPEED IN THE ANGLE OF DIRECTION | 1.0 | ○ | ° | 1 |
| 07 | ENGINE SPEED | 1.0 | × | rpm | 10 |
| 08 | AMOUNT OF ENGINE AIL | 1.0 | × | ml | 10 |
| 09 | ACCELERATOR OPENING ANGLE | 1.0 | ○ | ° | 0.1 |
| 10 | STEPPING-ON POWER OF BRAKE | 1.0 | ○ | N | 0.1 |
| 11 | STEERING ANGLE OF HANDLE | 1.0 | ○ | ° | 10 |
| 12 | DISTANCE BETWEEN CARS | 1.0 | ○ | mm | 10 |
| 13 | ANGLE OF THE VEHICLE RUNNING FOREGROUND | 1.0 | ○ | ° | 0.1 |
| 14 | STATUS OF SIGNAL | 1.0 | ○ | – | – |

OK CANCEL TRIGGER TYPE

FIG. 28

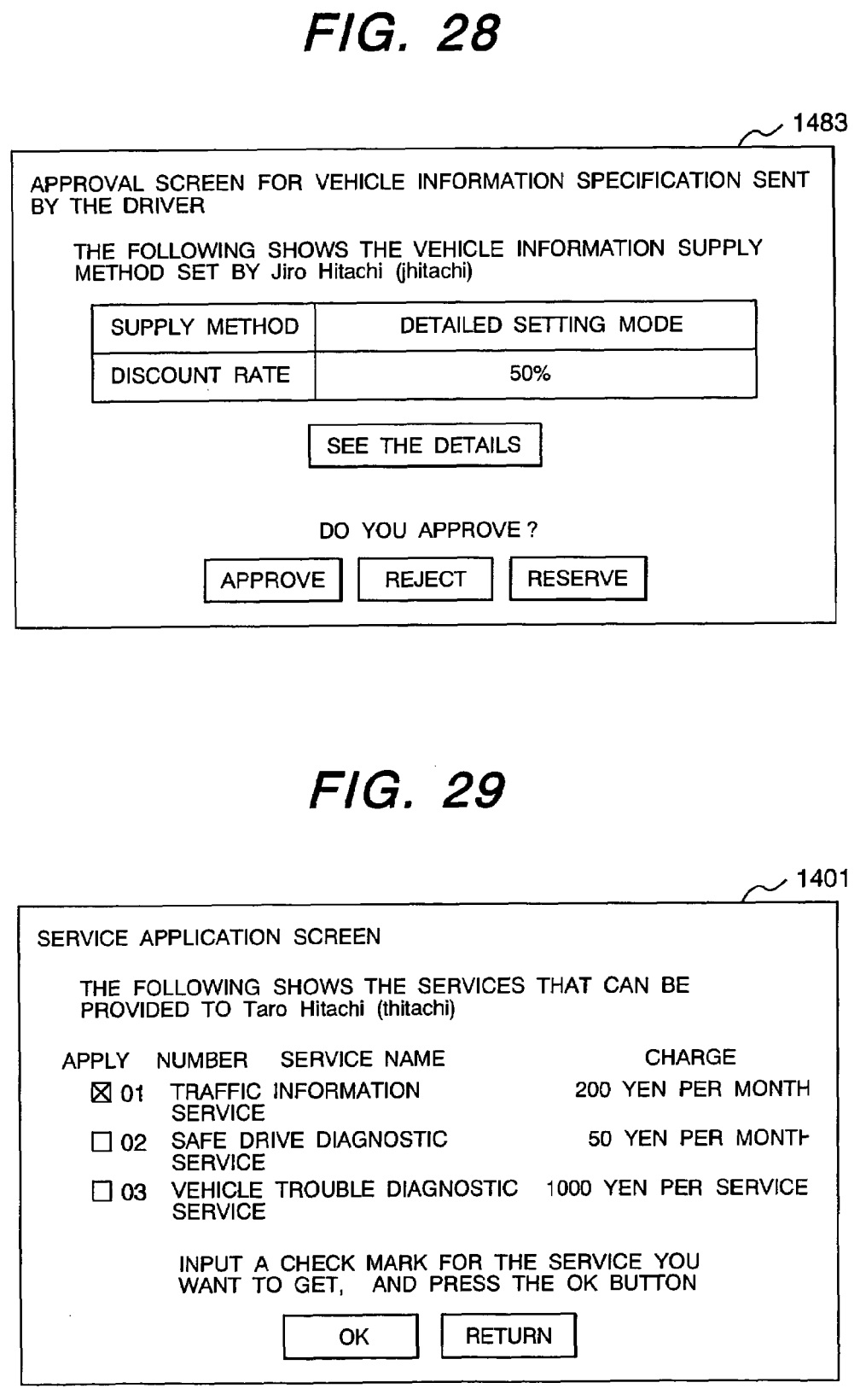

1483

APPROVAL SCREEN FOR VEHICLE INFORMATION SPECIFICATION SENT BY THE DRIVER

THE FOLLOWING SHOWS THE VEHICLE INFORMATION SUPPLY METHOD SET BY Jiro Hitachi (jhitachi)

| | |
|---|---|
| SUPPLY METHOD | DETAILED SETTING MODE |
| DISCOUNT RATE | 50% |

[SEE THE DETAILS]

DO YOU APPROVE ?

[APPROVE] [REJECT] [RESERVE]

FIG. 29

1401

SERVICE APPLICATION SCREEN

THE FOLLOWING SHOWS THE SERVICES THAT CAN BE PROVIDED TO Taro Hitachi (thitachi)

| APPLY | NUMBER | SERVICE NAME | CHARGE |
|---|---|---|---|
| ☒ | 01 | TRAFFIC INFORMATION SERVICE | 200 YEN PER MONTH |
| ☐ | 02 | SAFE DRIVE DIAGNOSTIC SERVICE | 50 YEN PER MONTH |
| ☐ | 03 | VEHICLE TROUBLE DIAGNOSTIC SERVICE | 1000 YEN PER SERVICE |

INPUT A CHECK MARK FOR THE SERVICE YOU WANT TO GET, AND PRESS THE OK BUTTON

[OK] [RETURN]

FIG. 32

1761

SAFE DRIVE DIAGNOSTIC SERVICE CONTENTS OUTPUT SCREEN

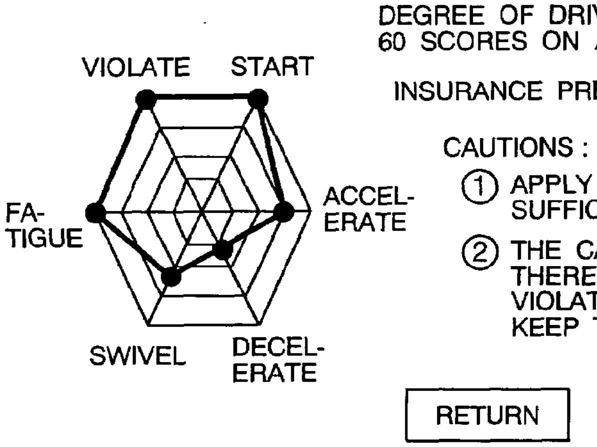

DEGREE OF DRIVING SAFETY :
60 SCORES ON A SCALE OF 100 SCORES

INSURANCE PREMIUM DISCOUNT RATE : 5%

CAUTIONS :

① APPLY BRAKE KEEPING SUFFICIENT SAFETY

② THE CAR STARTS SMOOTHLY
THERE IS NOT MUCH FATIGUE OR VIOLATION
KEEP THIS CONDITION

RETURN

FIG. 33

1762

VEHICLE TROUBLE DIAGNOSTIC SERVICE CONTENTS SCREEN

| TROUBLE | DEGREE OF DANGER | DIFFICULTY OF REPAIR |
|---|---|---|
| ENGINE WATER TEMPERATURE IS TOO HIGH | INTER-MEDIATE | EASY |
| THE METER DEFLECTS | INTER-MEDIATE | DIFFICULT |
| ABNORMAL NOISE IS GENERATED FROM THE BRAKE | HIGH | INTER-MEDIATE |
| FUEL ECONOMY IS POOR | LOW | EASY |

RETURN

VEHICLE INFORMATION COLLECTION SYSTEM AND METHOD THEREOF

BACKGROUND OF THE INVENTION

The present invention relates to a vehicle information collection method and system used to collect vehicle information and to categorize it at an information center so as to provide services.

There is a system that allows information on a vehicle (i.e., vehicle information) to be collected by an on-board terminal, and categorized in an information center, whereby the categorized results are used for traffic information service, vehicle trouble diagnostic service and vehicle non-life service.

In the traffic information service, vehicle speed and current position are collected by the an-board terminal and categorized at an information center, thereby generating information on traffic congestion and transmitting it to the on-board terminal.

In the trouble diagnostic service of a vehicle disclosed in the Japanese Laid-Open Patent Publication No. Hei 05-332888, information on the statuses of a vehicle such as vehicle speed, engine speed and accelerator opening angle is obtained from the on-board terminal and is categorized at the information center, whereby the results of diagnosis are transmitted to the vehicle.

Japanese International Patent Publication No. Hei 11-511581 discloses a vehicle non-life service wherein information on the statuses of a vehicle such as the vehicle speed, current position and azimuth angle speed is obtained from the on-board terminal and is categorized at the information center to analyze the rate of traffic accidents and to determine the insurance premium, whereby insurance premium discount service is provided to a vehicle characterized by a low rate of accidents.

SUMMARY OF THE INVENTION

In the prior art vehicle information collection method and system, vehicle information is categorized at an information center. This has given a user a sense of psychological resistance that vehicle information that a driver does not want to be viewed by others would be exposed to the eyes of an operator of the information center.

Further, there is concern about possible violation of privacy; i.e., when vehicle information is supplied to the information center, the information would be revealed to a third party if security measures are insufficient. If vehicle information is not supplied in order to protect against possible violation of privacy by a third party, the information center may not provide desired services to the user due to lack of information.

The invention allows drivers to mask their vehicle information, wherein the specification of vehicle information to be transmitted or recorded hereinafter referred to as “vehicle information specification”) is inputted from the on-board terminal of a vehicle or driver’s information terminal, and vehicle information is transmitted or recorded to the on-board terminal according this vehicle information specification.

When the information is masked, information required for services provided by an information center may be reduced by half. So charges are determined depending on the percent of the information required for services that is transmitted to the information center. In this case, charges are determined in such a way that the service charges are reduced as the degree of disclosure is increased through setting by the driver.

BRIEF DESCRIPTION OF THE DRAWINGS

FIG. 24 is a vehicle information specification detailed setting screen;

FIG. 25 is a vehicle information specification detailed setting screen;

FIG. 28 is an approval screen for vehicle information specification sent by the driver;

FIG. 29 is a service application screen;

FIG. 32 is a safe drive diagnostic service contents output screen; and

FIG. 33 is a vehicle trouble diagnostic service contents screen.

DETAILED DESCRIPTION OF THE PREFERRED EMBODIMENT

Figure 1:
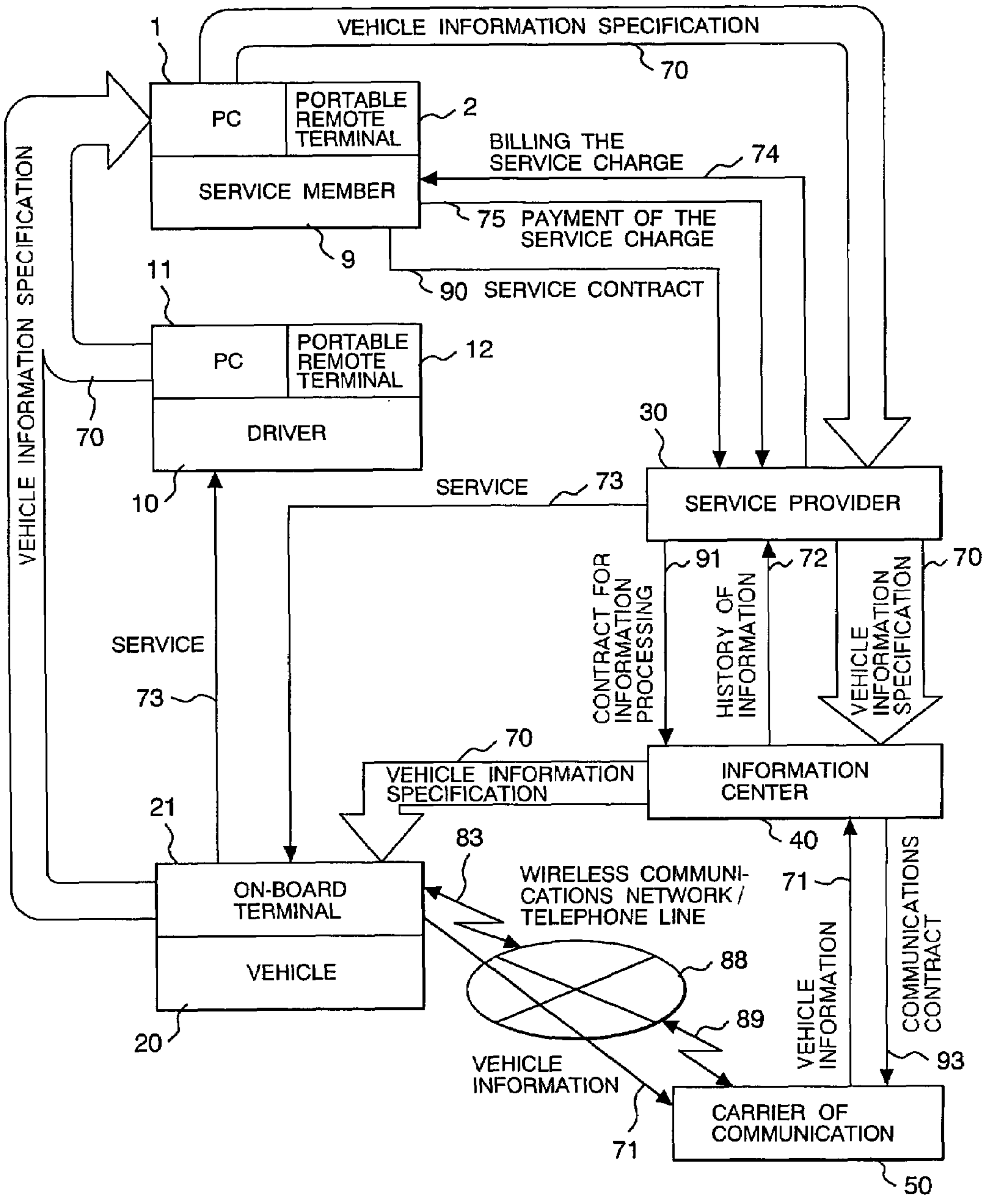
FIG. 1 is a block diagram representing the system in an embodiment of the present invention.

Referring to drawings, the following describes the preferred embodiments of the present invention: FIG. 1 is a block diagram representing the system in an embodiment of the present invention. In this embodiment, a corporation is assumed as a service member 9, which is assumed to own a PC 1 and a portable remote terminal 2 and to have a driver 10 as an employee. The driver 10 is employed by the service member 9, and has a PC 11 and portable remote terminal 12. An on-board terminal 21 is installed in a vehicle 20.

The on-board terminal 21 collects the vehicle information 71 of the vehicle 20 and transmits vehicle information 71 to an information center 40 via a carrier of communication 50. Here the vehicle information 71 refers to all the information on the status of the car 20, information on the status of the driver 10 and information on the traveling environment of the vehicle 20.

It includes all the information that can be collected from inside or outside the vehicle 20. Information on the status of the vehicle 20 includes, for example, the current position of the vehicle 20 (latitude and longitude), vehicle speed, angle of direction, speed in the angle of direction, engine speed, the volume of engine oil.

The information on the status of the driver 10 includes accelerator opening angle, stepping-on power of brake and steering angle of handle. The information on the traveling environment of the vehicle 20 includes the distance between cars, angle of the vehicle running foreground and colors.

The information center 40 processes the vehicle information 71 into a history of information, and transmits it to a service provider 30. The service provider 30 generates the service content that can be realized by the history of vehicle information 72, and provides services 73 to the driver 10. The service provider 30 bills the service member 9 for the services 73 provided (74), and the service member 9 pays service charges to the service provider 30 (75).

In this case, the driver 10 uses the PC 11 or portable remote terminal 12 to set the vehicle information specification 70 specifying the cycle of transmitting or recording, the range of the value, the precision of the value or the like in vehicle information 71, and transmits the vehicle information specification 70 to the PC 11 or portable remote terminal 12 of the service member 9.

The service member 9 carries out processing for approving the vehicle information specification 70 and transmits the result to the service provider 30 through the PC 11 or portable remote terminal 12. The service provider 30 transmits the vehicle information specification 70 to the on-board terminal 21 through the information center 40. The on-board terminal 21 transmits or records the vehicle information 71 according to the vehicle information specification 70.

Figure 5:
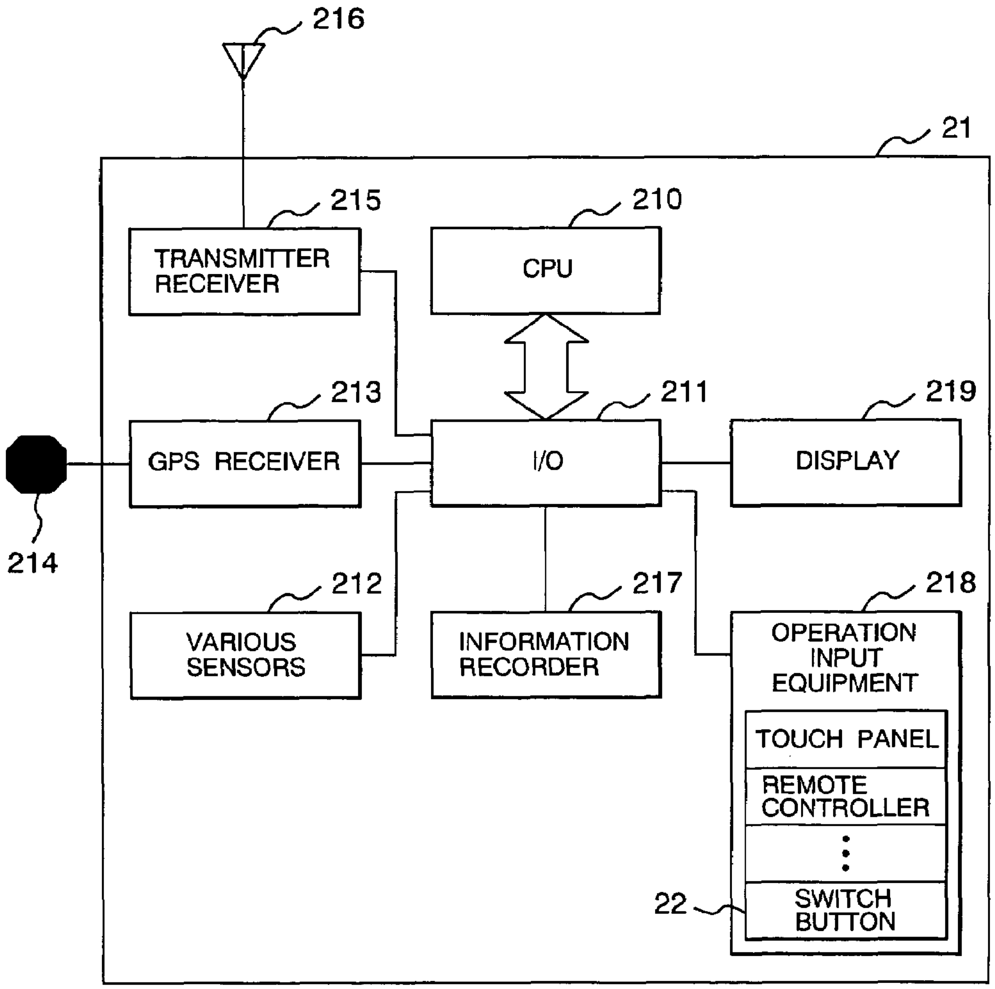
FIG. 5 is a diagram representing the configuration of an on-board terminal.

To put it more specifically, the on-board terminal 21 has a configuration as given in FIG. 5. The on-board terminal 21 consists of one or more CPU 210, an I/O 211 for conveying the instruction of this CPU 210 to each device, various sensors 212 for transmitting the information on the status of the vehicle 20 carrying the on-board terminal 21 or the operation of the driver 10, a GPS (Global Positioning System) receiver 213 for measuring the position in response to the time of day of the vehicle 20, a GPS antenna 214 for detecting the radio waves from the satellite for GPS, a radio transmitter-receiver 215 for radio communication, radio antenna 216, information recorder 217, operation input equipment 218 for receiving the input by the driver 10, and a display 219 for displaying the contents of the service 73.

The operation input equipment 218 may be provided with a switch button 22 as a trigger for transmitting the vehicle information (to be described later), in addition to a touch panel, remote control input equipment or a level and stock for indicating the traveling direction of a cursor or pointer.

Figure 6:
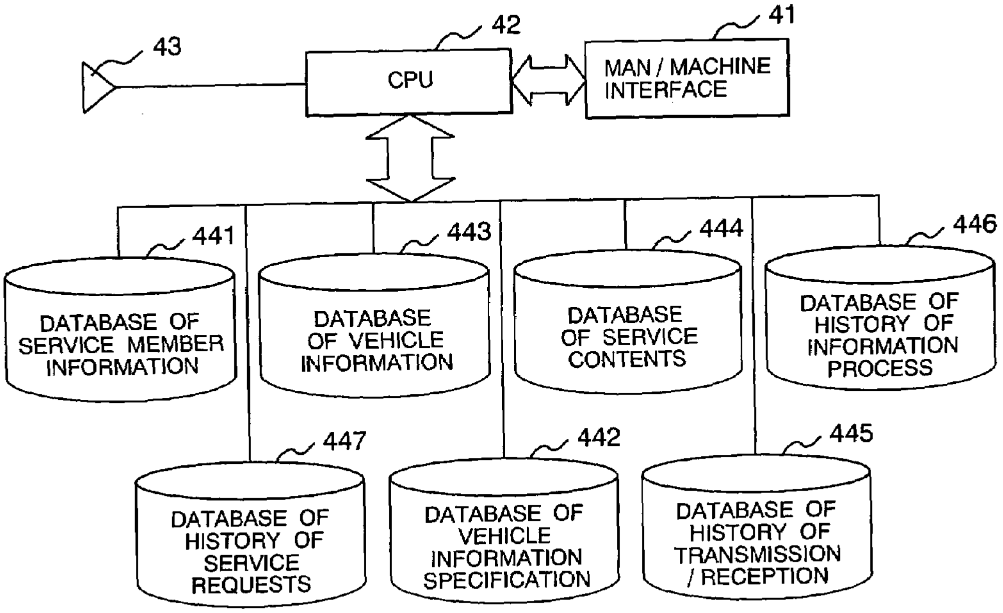
FIG. 6 is a diagram representing the information system configuration of an information center.

The information system of the information center 40 is configured as shown in FIG. 6. The information system on the information center consists of one or more information terminals. The information system consists of a CPU 42 of the information terminal, a man/machine interface 41 of this information terminal, an information transmitter-receiver 43, a database of service member information 441 for storing information on service members, a database of vehicle information specification 442 for storing the vehicle information specification 70, a database of vehicle information 443 for storing the vehicle information 71, a database of service contents 444 for storing service contents, a database of history of transmission/reception 445 for storing the vehicle information 71, a database of history of information process 446 for storing the history of information processing carried out for each service member or driver at the information center, a database on the history of service requests 447 for storing information on the request for services from a service member.

Figure 7:
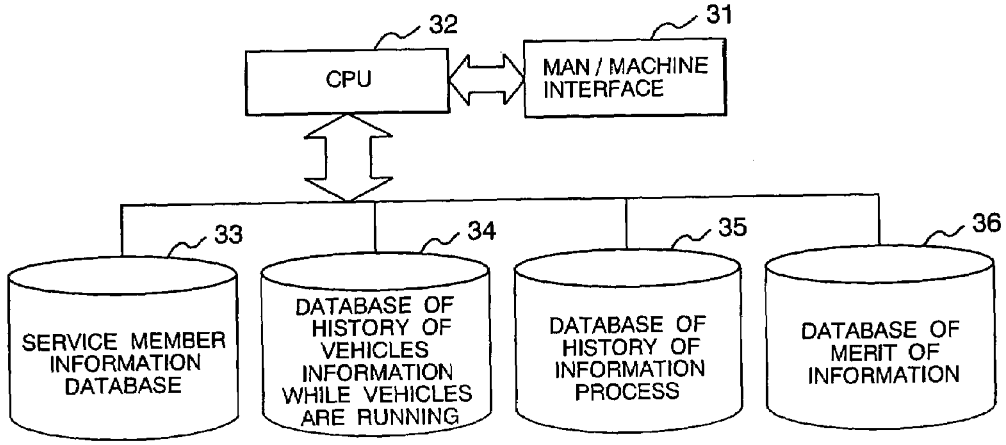
FIG. 7 is a diagram representing the information system configuration of a service provider.

The information system of the service information 30 is configured as shown in FIG. 7. The information system of the service information 30 consists of one or more information terminals. The information system comprises a CPU 32 of the information terminal, a man-machine interface 31 for information terminal, a service member information database 33 for storing information on service members, a "database of history of vehicles information while vehicles are running" 34 for storing the history of vehicle information 72, a database of history of information process 35 for storing the history of information process carried out by the service provider, and a database of merit of information for storing the merit of information 36 calculated from the vehicle information specification 70.

The PC 1 or portable remote terminal 2 of the service member 9, PC 1 or portable remote terminal 2 of the driver 12, service provider 30, information center 40 and carrier of communication 50 are each connected to a communications network/telephone network via the media of communications, and communications are carried out among them.

Either wired or wireless means can be used for the communications network and telephone network. The wired communications network and telephone network 89 are used for communications between the on-board terminal 21 mounted on the vehicle 20 and the carrier of communication 50. They are each connected to the wired communications network and telephone network 89 through the media of wireless communications 83 and 88.

The service member 9 holds a service contract 90 with the service provider 30. The service member specifies one or more drivers 10 and one or more vehicles 20 under this service contract 90. The service provider 30 holds an information processing contract 91 with the information center 40 on the commissioning of information processing. The information center 40 holds a communications contract 93 with the carrier of communication 50 on communications carriers.

Figure 2:
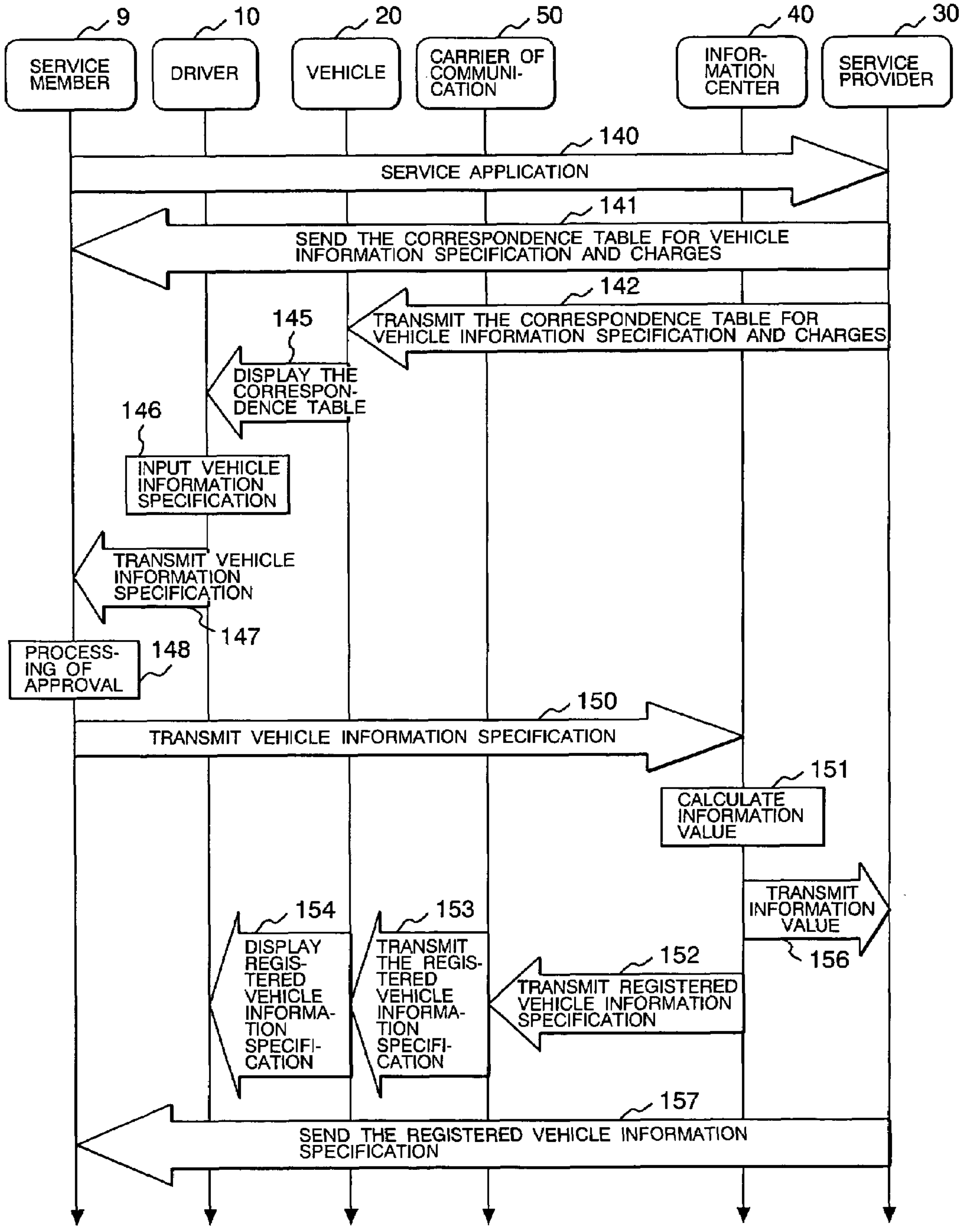
FIG. 2 is a flowchart representing the processing of registering vehicle information specification in an embodiment of the present invention.
Figure 4:
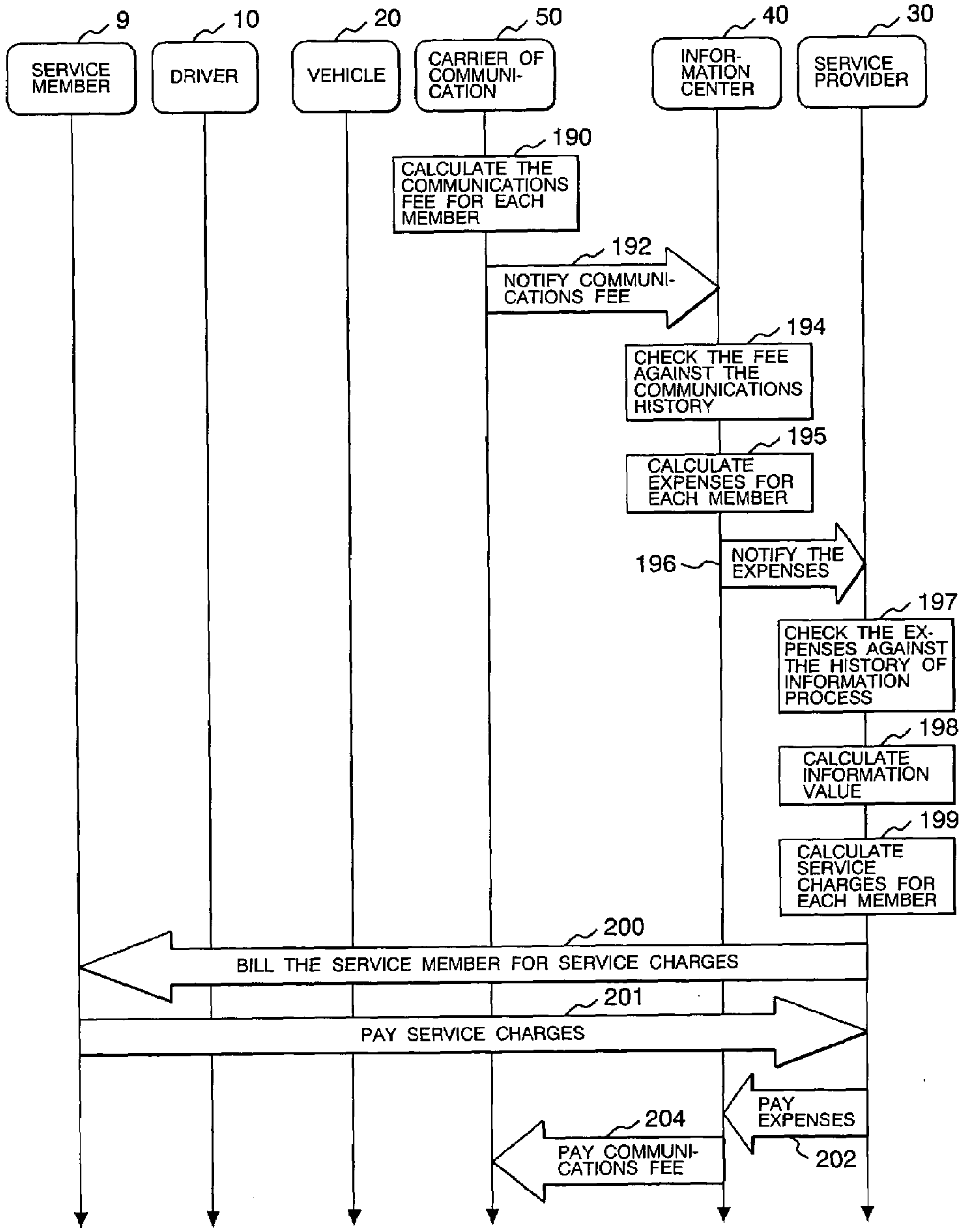
FIG. 4 is a flowchart representing the processing of calculating the service charges in an embodiment of the present invention.

FIGS. 2 and 4 are processing flow charts representing an embodiment of the present invention. Processing in this embodiment comprises the following six phases; service enterprise start-up, service member registration procedure, registration of vehicle information specification, creation of service contents, transmission of service contents and calculation of service charges. The following describes the processing flow for each phase:

In the phase of starting the service enterprise, the information center 40 signs a communications contract 93 with the carrier of communication 50, as shown in FIG. 1. Further, the service provider 30 signs an information processing contract 91 with the information center 40.

In the phase of service member registration procedure, a service member 9 carries out the processing of applying to the service provider 30 for membership. In the processing of membership application, information inputted into the PC 1 is transmitted to the system of the service provider. The service provider 30 processes membership application according to the description transmitted in the phase of membership application.

The service provider 30 transmits a membership registration report to the registered service member 9, and performs processing of transmitting them in the same number as that of vehicles 20 for distribution to the on-board terminal 21. Further, the processing of sending for distributing the program to be run on the PC 11 or portable remote terminal 12 required for the procedure. This on-board terminal 21 is distributed from the service member 9 to the driver 10, and is installed on the vehicle 20.

When the on-board terminal 21 is installed on the vehicle 20, the driver 10 performs an operation test of the on-board terminal 21 according to the instruction of the service member 9. The driver 10 inputs an instruction into the on-board terminal 21 to start an operation test. The on-board terminal 21 the vehicle information 71 for operation test to the information center 40.

The information center 40 the result of testing the on-board terminal 21 (e.g. the details of the vehicle information 71 is physically adequate or defective) to the service provider 30. The service provider 30 transmits the result of operation test to the on-board terminal 21. The on-board terminal 21 indicates the result of the operation test on the display 219. Further, the service provider 30 sends the result of the operation test to the service member 9.

In the phase of vehicle information specification registration shown in FIG. 2, the service member 9 performs the service application procedure with respect to the service provider 30 (140). To put it more specifically, the input processing program running on the PC 1 or portable remote terminal 2 is started, and the log-in screen of the service member program is indicated on the PC 1 or portable remote terminal 2.

Figure 26:
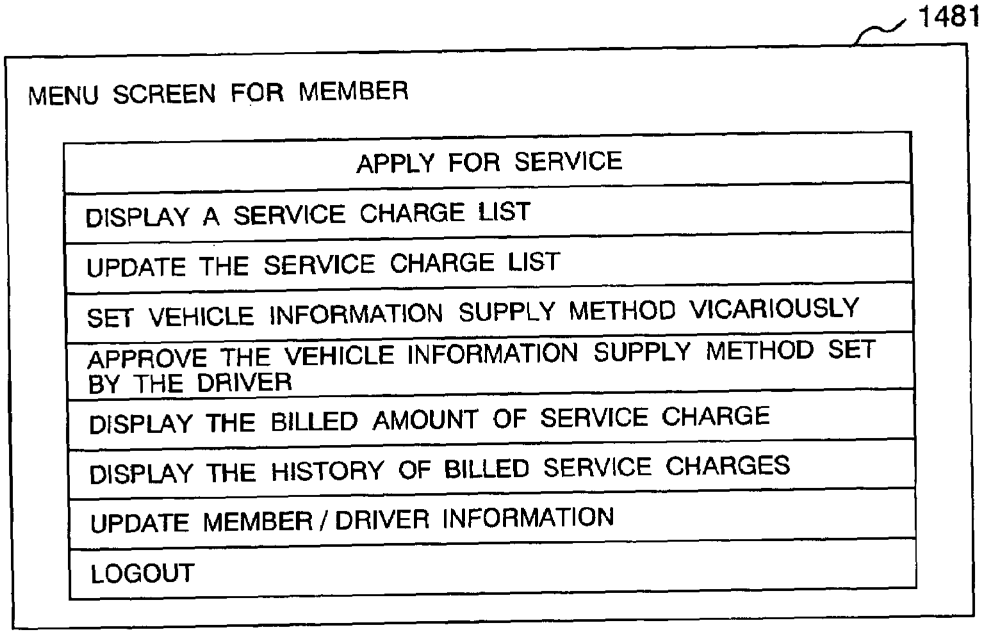
FIG. 26 is a service member program menu screen.

Further, the long-in name and password are inputted and are then certified. Upon successful completion of certification, the menu screen 1481 of the input processing program for the service member is indicated, as shown in FIG. 26. When the item "Apply for Service" has been selected from this menu, service application screen 1401 is indicated, as shown in FIG. 29.

In the service application screen 1401, the service name having been certified on the log-in screen to be available to the user is indicated together with the required charge. The application item is inputted according to the input message on this screen, thereby determining an applied service item, for example, traffic information service, safe driving diagnostic service or vehicle trouble diagnostic service).

Having received application for services, the service provider 30 sends a correspondence table for the vehicle information specification 70 and charges in response to each of the applied services (hereinafter referred to as "vehicle information specification/charge correspondence table"), to the service member 9 (141).

Figure 19:
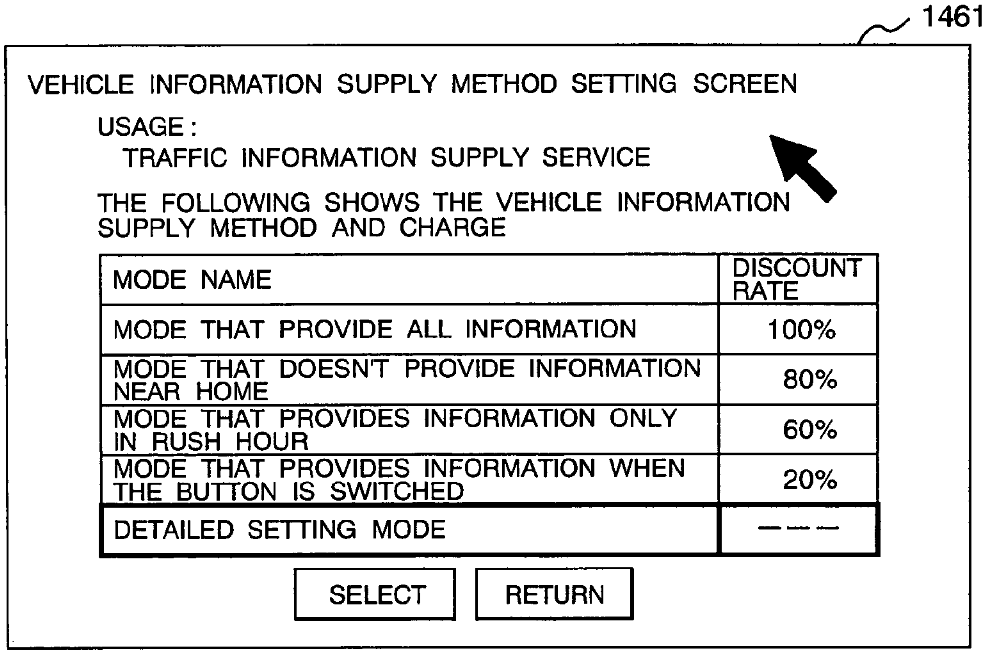
FIG. 19 is a vehicle information supply method setting screen.
Figure 20:
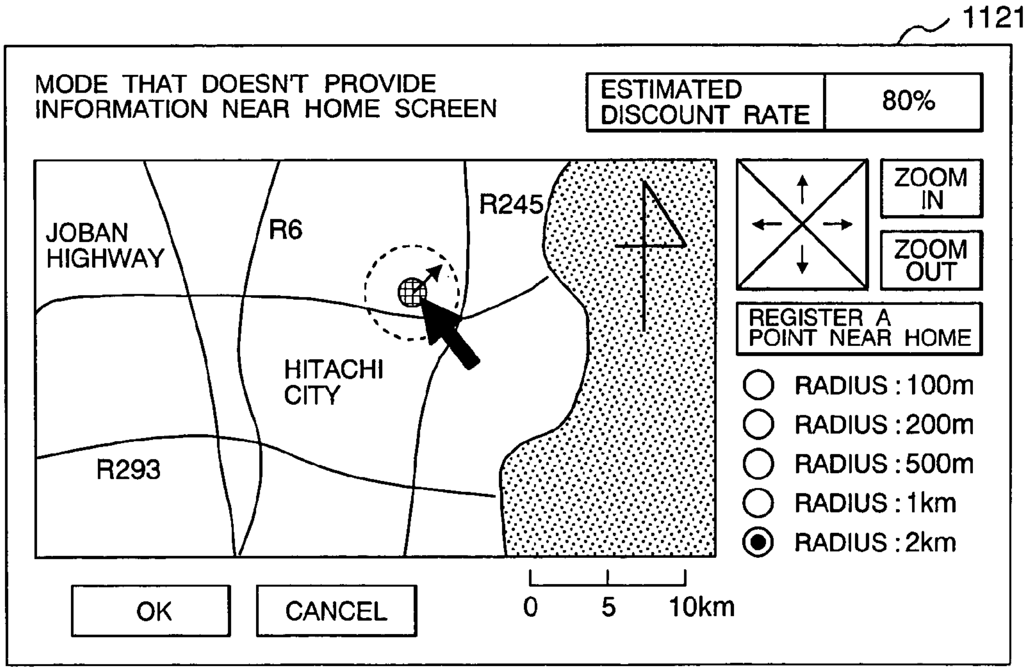
FIG. 20 is a screen for setting “the mode that doesn’t provide information near home”

Further, the correspondence table for vehicle information specification and charges is transmitted or distributed to the on-board terminal 21 (142). When the vehicle information setting program or the on-board terminal program on the PC 11 or portable remote terminal 12 has been run by the driver 10, the log-in screen is displayed. When the log-in name and password are inputted in the system, a vehicle information supply method setting screen 1461 appears on the display 219, as shown in FIG. 19 (145).

"Use" showing the application service of the provided vehicle information, "Mode name" as a form of supplying vehicle information, and "Discount rate" providing information on the discount rate of the charge corresponding to this "mode name" are displayed on this screen.

Information is provided in the following modes: (1) "The mode that provide all information" wherein all vehicle information during traveling is provided; (2) "The mode that doesn't provide information near home" wherein all vehicle information is provided except when traveling through a preset point near the home; (3) "The mode that provides information only in rush hour" wherein vehicle information is provided only in the time zone of morning and evening rush hours; and (4) "The mode that provides information when the button is switched" wherein supply of vehicle information is left to the choice of the driver, and whether vehicle information is provided or not is determined by operating the button on the unit in the vehicle.

When vehicle information is provided in each of these modes, the discount rates of traffic information services are 100%, 80%, 60% and 20% in this example. The mode that is likely to provide a greater amount of information is supplied with a higher discount rate of the service charge.

The driver 10 inputs the vehicle information specification 70 from a vehicle information supply method setting screen 1461 on the PC 11, portable remote terminal 12 or on-board terminal 21. If required, a vehicle information specification detailed setting screen 1462 is displayed as shown in FIG. 29, and vehicle information specification is inputted (146).

In FIG. 19, the "mode that provides all information" refers to the mode where the vehicle information 71 is recorded or transmitted based on the vehicle information specification 70 specified by the service provider 30. The "mode that doesn't provide information near home" refers to the mode where vehicle information 71 is not provided at a preset point near the home. To put it more specifically, when the latitude or longitude is within a certain range, the vehicle information 71 at that time is not recorded or sent.

The "mode that provides information only in rush hour" indicates the mode wherein vehicle information 71 is recorded or transmitted only in the preset time zone of rush hours. To put it more specifically, if the value for time of the day is within a certain range, the vehicle information 71 is not recorded or sent. The "mode that provides information when the button is switched" indicates the mode wherein recording or sending of the vehicle information 71 is initiated or terminated by pressing the button. The detailed setting mode refers to the mode where the vehicle information specification 70 is set by the driver 10.

When the driver 10 has selected the "mode that doesn't provide information near home", the map screen 1121 is displayed. Using this map screen 1121, the driver 10 specifies the location of his or her home. Then the driver 10 selects and sets the range (number of meters from his or her home) where the information is not provided. This range can be either circular or polygonal.

Figure 21:
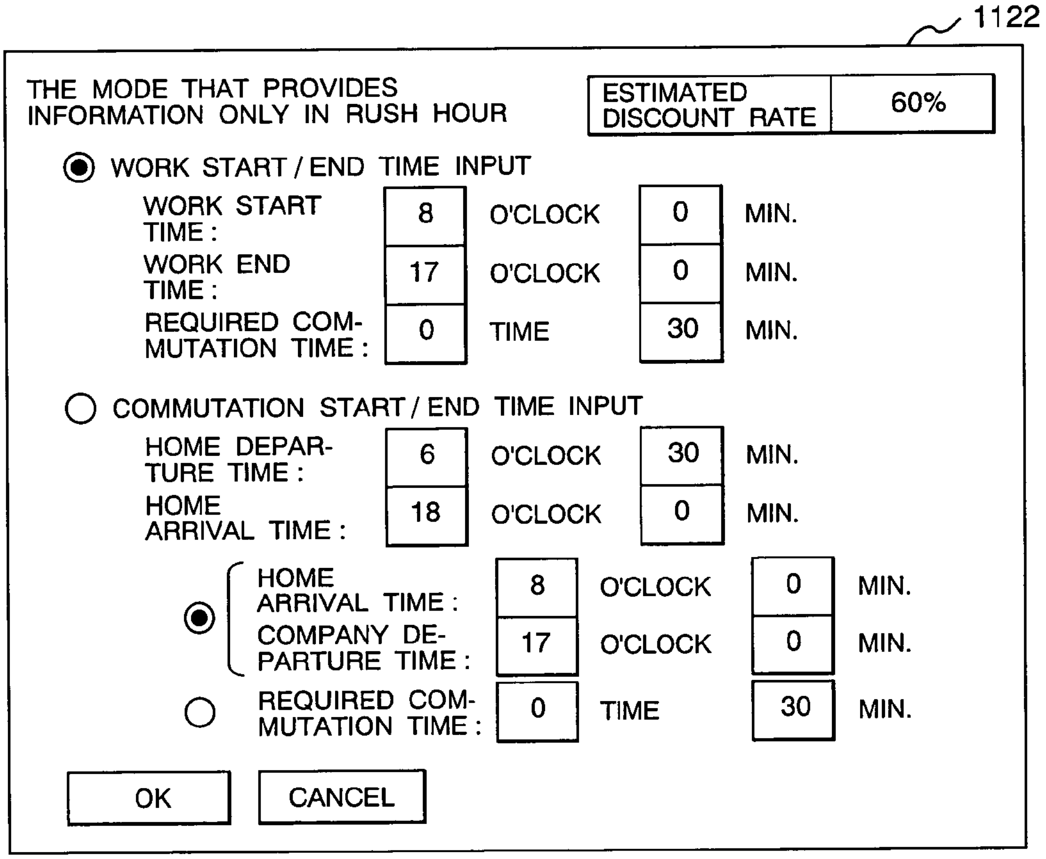
FIG. 21 is a screen for setting “the mode that provides information only in rush hour”

When the driver 10 has selected the "mode that provides information only in rush hour", there appears a screen 1122 showing the time for starting travel to the company, the time for completing travel to the company, the time for starting travel to the home and the time for completing travel to the home, as shown in FIG. 21. The driver 10 inputs the time for each item, thereby setting the time zone for information supply.

Figure 22:
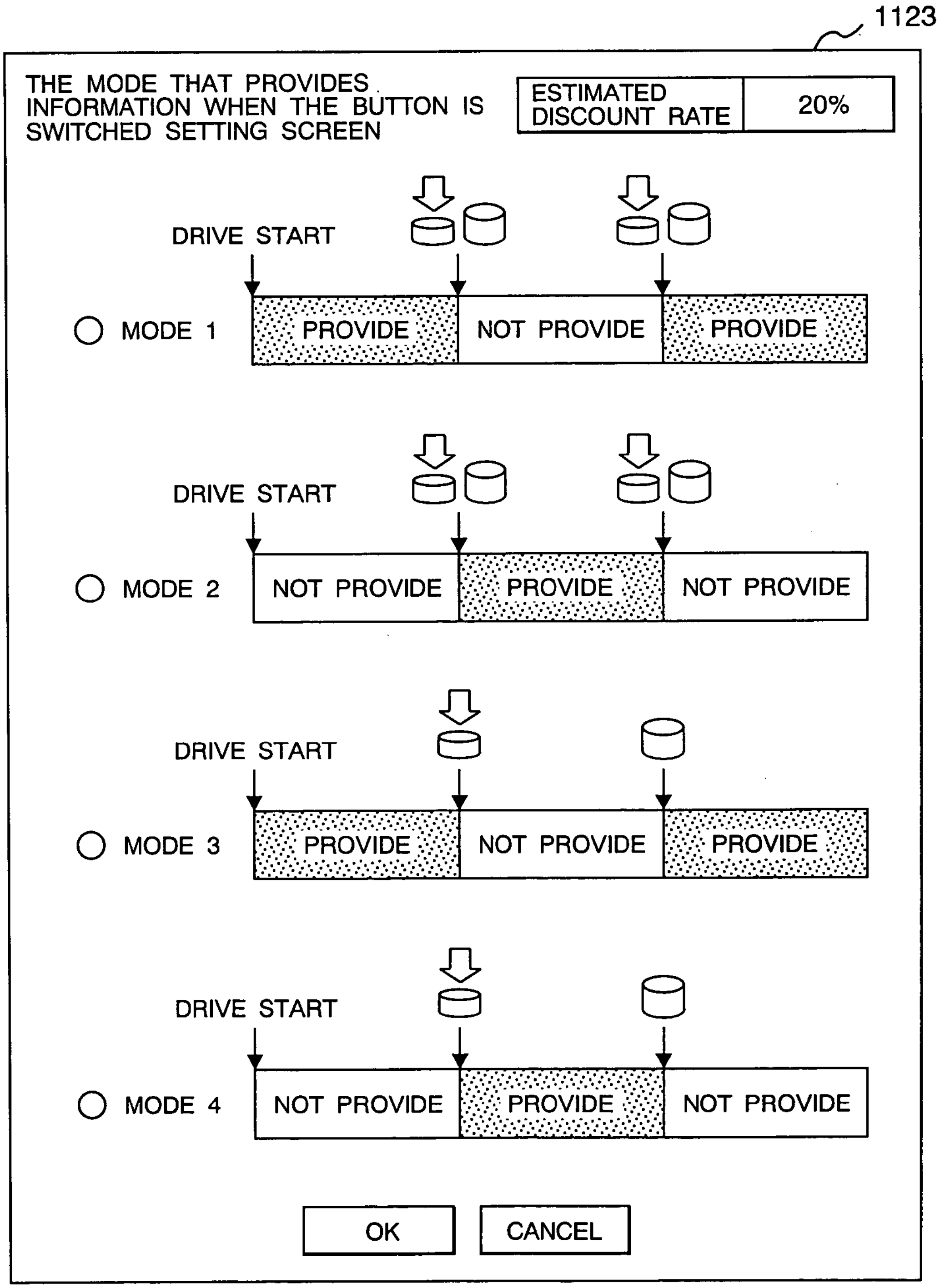
FIG. 22 is a screen for setting “the mode that provides information when the button is switched”

When the driver 10 has selected the "mode that provides information when the button is switched", there appears a screen 1123 showing the types of trigger of the button given in FIG. 22. There are four types of trigger; i.e. Mode 1 where vehicle information 71 is not recorded or transmitted for the time the button is kept pressed; Mode 2 where the vehicle information 71 is recorded or transmitted for the time the button is kept pressed; Mode 3 where vehicle information 71 is kept recorded or transmitted from the moment the button is pressed; and Mode 4 where the vehicle information 71 is not recorded or transmitted from the moment the button is pressed. The driver 10 selects one of these four modes.

Figure 23:
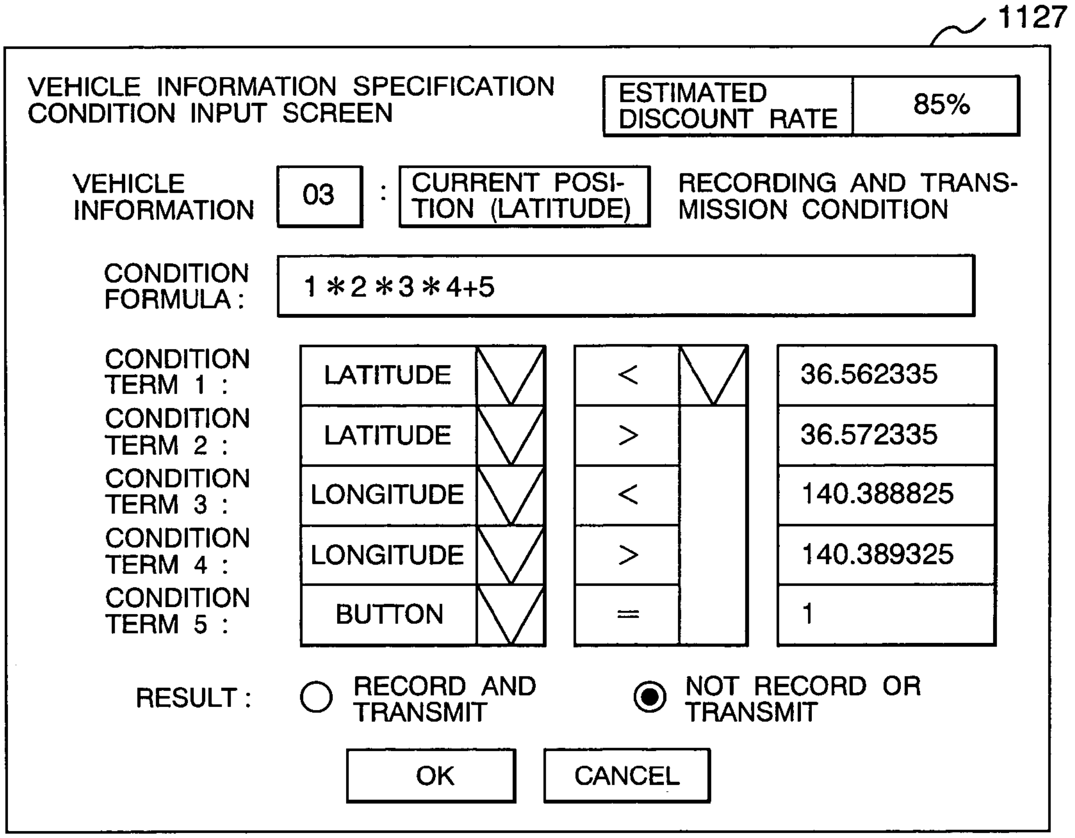
FIG. 23 is a vehicle information specification condition input screen.

When the driver 10 has selected the detailed setting mode, the vehicle information specification detailed setting screen 1462 appears as shown in FIG. 25, and the vehicle information specification is inputted. From this detailed setting screen, "Cycle (second)" of information supply, "Gather or not", "Precision" of the provided information are inputted in response to the "type of vehicle information" as a vehicle information item to be provided. On this screen, the "unit" of the provided data is shown. This "unit" depends on the vehicle. On this detailed setting screen, detailed setting screen 1125 is displayed as shown in FIG. 24 by scrolling the screen list in the horizontal direction. In addition to the cycle of recording and transmission for each item of vehicle information, it is possible to input the upper and lower limits of vehicle information, trigger type for activating the process of recording or sending, and recording or sending conditions for showing the conditions for recording or sending. The recording or sending conditions are set on the condition input screen 1127 of FIG. 23 displayed by pressing the condition term button corresponding to the type of vehicle information whose conditions are desired to be set on the detailed setting screen 1125.

The recording or sending conditions are condition formulae consisting of several condition terms, and comprise condition formulae showing the relationship between condition terms, and condition terms. For the condition terms, the following information is inputted for each number of condition terms such as "Condition term first" and "Condition term second"; (1) Position information such as "latitude" and "longitude", (2) information as a basis of determining the "Button" ON/OFF selection or the like, and (3) equality or inequality sign showing the relationship of evaluation among condition terms, and (4) setting values such as equal value or threshold value in evaluation. For recording and transmission conditions, the condition formulas where the evaluation relationship of condition terms are represented by AND/OR conditions are inputted using the numbers of condition terms. Further, selection is made to determine if the vehicle information is recorded/sent or not, when agreement with the condition formula has been obtained.

The display of the estimated discount rate is changed synchronously with the mode setting made by the driver 10 through selection of the mode for vehicle information specification supply method.

Figure 27:
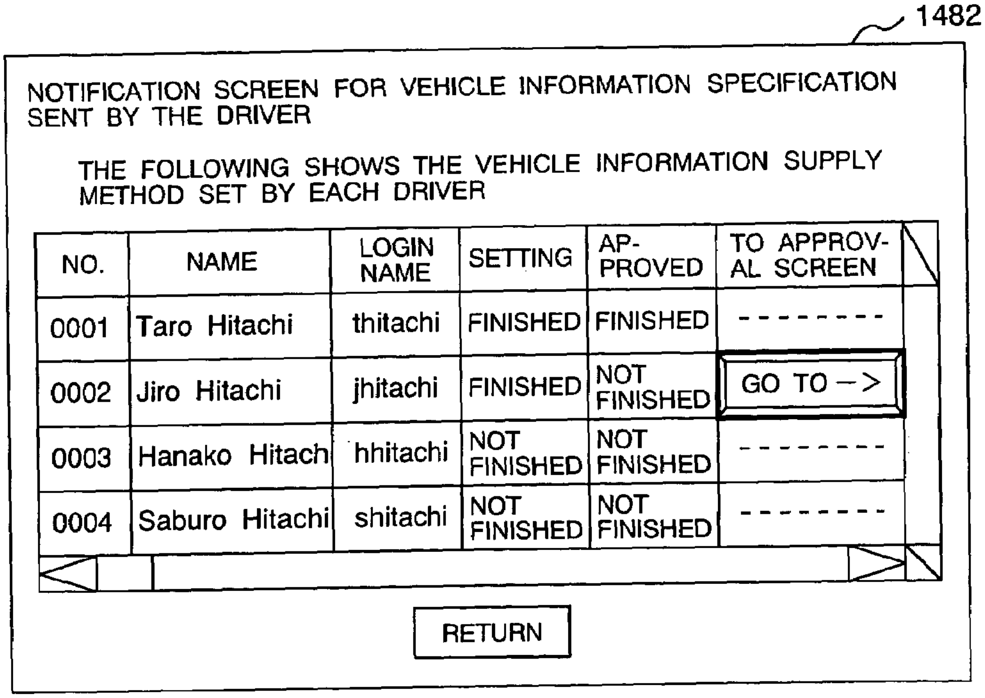
FIG. 27 is a notification screen for vehicle information specification sent by the driver.

The vehicle information specification 70 is transmitted to the service member 9 by the PC 11, portable remote terminal 12 or on-board terminal 21 (147). The service member 9 displays the notification screen 1482 for vehicle information specification transmitted by the driver 10 as shown in FIG. 27. A name and login name list of the driver having signed a contract with the service member 9 is displayed on this screen.

The vehicle information supply method at the on-board terminal mounted on the vehicle driven by the driver, the status of setting and the status of approval of the setting by the service member 9 are displayed for each driver. A button for shift to an approval screen 1483 is displayed for the driver whose approval is not yet finished despite completion of registration with the on-board terminal.

To approve the setting of the driver having inputted the vehicle information specification 70, the vehicle information specification approval screen 1483 is displayed, as shown in FIG. 28. The vehicle information specification 70 set by the driver 10 and the resultant discount rate are displayed on this approval screen 1483. A button for confirmation of the detailed conditions and approve/reject/reserve setting buttons are also displayed. By selecting these setting buttons, processing of approval is performed to determine whether the driver can use these setting conditions or not (148).

The approved vehicle information specification 70 is transmitted to the information center 40 by the service member 9 (150). The information center 40 registers the vehicle information specification 70 on the database of vehicle information specification 442. Information value is calculated based on the vehicle information specification 70 having been transmitted (151), and the information value is transmitted to the service provider (156).

The information center 40 transmits the registered vehicle information specification 70 to the on-board terminal 21 through the carrier of communication 50 (152 and 153). The on-board terminal 21 allows the registered vehicle information specification 70 to be displayed on the display 219 (154). Further, the service provider 30 sends the registered vehicle information specification 70 and its information value to the service member 9 (157).

Figure 3:
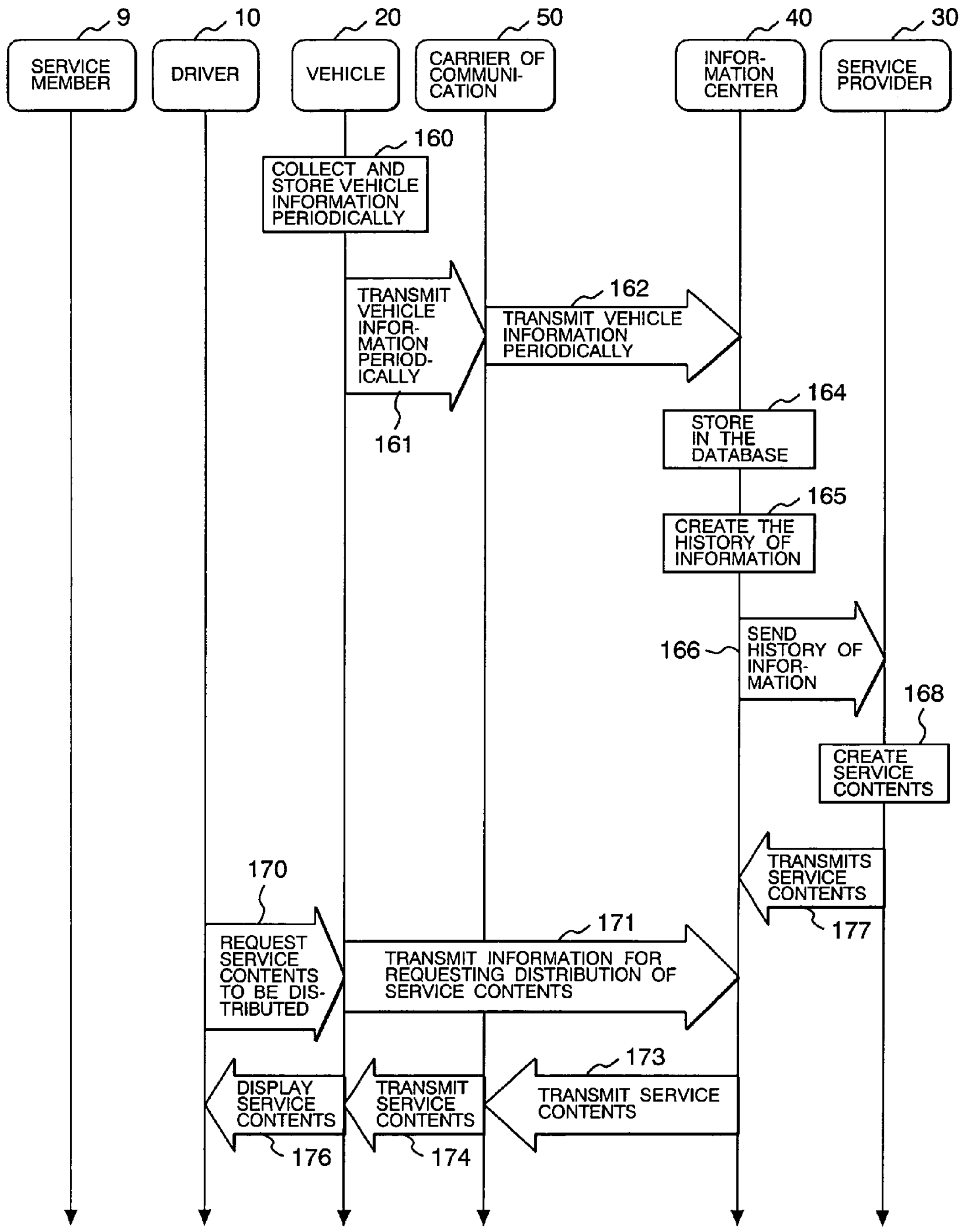
FIG. 3 is a flowchart representing the processing of service contents in an embodiment of the present invention.

In the phase of creating the service content shown in FIG. 3, the on-board terminal 21 collects vehicle information 71 from various sensors 212 periodically in the vehicle 20, and stores it in the storage device (160). When the vehicle information specification 71 in the storage device of the CPU 210 has been stored to reach a certain amount, the on-board terminal 21 processes the vehicle information 71 according to the vehicle information specification 70.

The on-board terminal 21 transmits vehicle information subsequent to processing, to the information center 40 through the carrier of communication 50 (161, 162). Here communication charges accrued to the carrier of communication. In the information center 40, the vehicle information having been transmitted subsequent to processing is stored in the database of vehicle information 443 (164), and the history of vehicle information 72 is created (165).

The information center 40 sends the history of vehicle information 72 to the service provider 30 (166). Here the expenses required by the creation of the history of vehicle information 72 accrue. The service provider 30 creates service contents based on the history of vehicle information 72 (168). Here the expenses required by the creation of the service contents accrue. The created service contents are transmitted to the information center 40 in advance by the service provider 30 (177).

Figure 30:
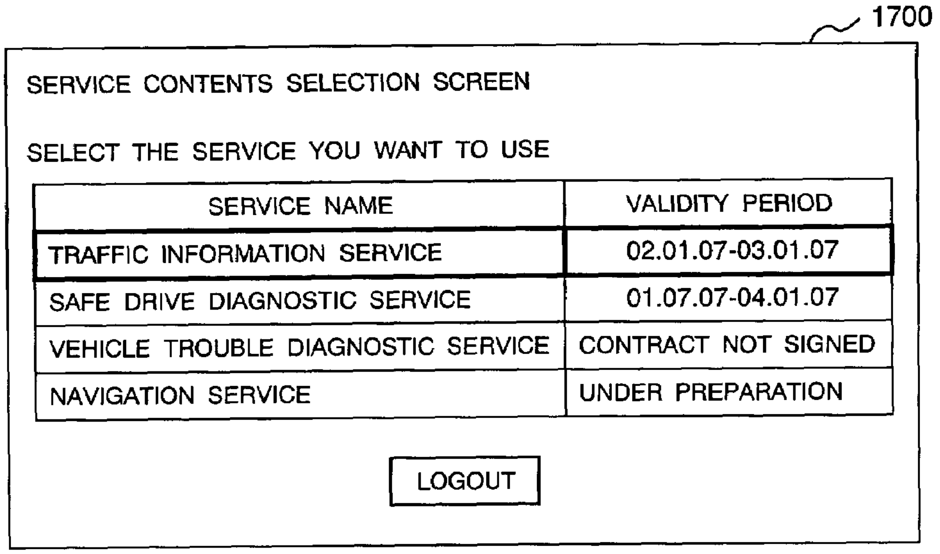
FIG. 30 is a service contents selection screen.

In the phase of sending the service contents, the driver 10 activates the on-board terminal 21 as shown in FIG. 3, and displays the service contents selection screen 1760, as shown in FIG. 30. The presence/absence of the service supply contract and the period of contract is displayed in response to the provided service name of this selection screen, so that the name of the service that can be provided can be checked. The driver selects a desired item from the items that can be provided, and inputs it into the on-board terminal 21, thereby requesting the service contents to be distributed (170).

The on-board terminal 21 transmits information for requesting distribution of service contents, to the information center 40 (171). Here communications fee accrues to the carrier of communication 50. Based on the request for distribution of the service contents, the information center 40 transmits the service contents through the carrier of communication 50 (173 and 174). In this case, communications fee occurs to the carrier of communication 50. The on-board terminal 21 displays service contents for the driver 10 (176).

Figure 31:
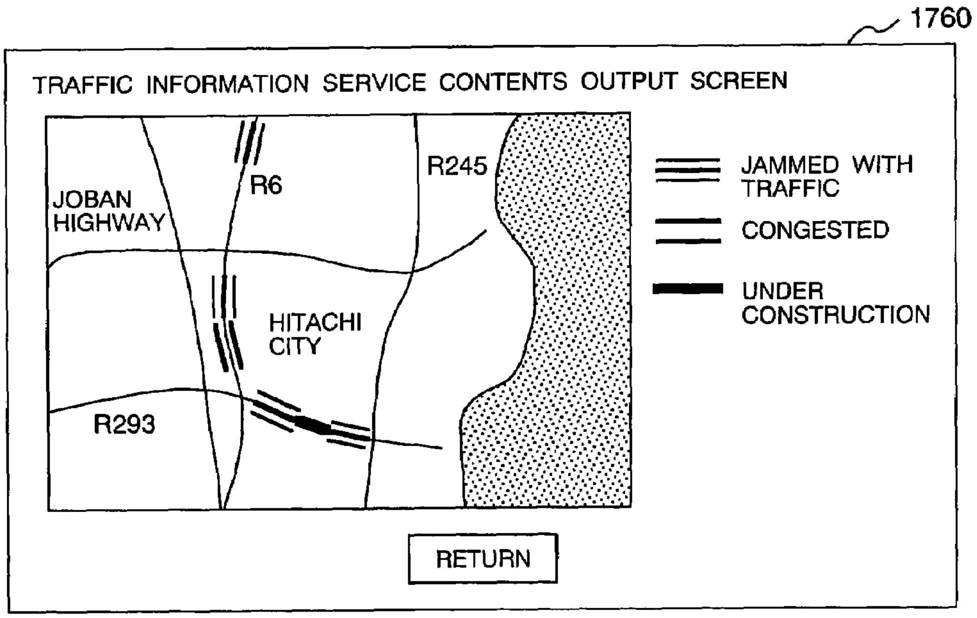
FIG. 31 is a traffic information service contents output screen.

The service contents are displayed as follows: The output screen 1760 shown in FIG. 31 is displayed in the case of traffic information service. The output screen 1761 shown in FIG. 32 is displayed in the case of safe drive diagnostic service, and the output screen 1760 shown in FIG. 33 is displayed in the case of vehicle trouble diagnostic service.

In the case of traffic information service, a map is displayed to show the position of the vehicle and the position close to a specified point, as shown in FIG. 31. On this map, further, traffic information of the surrounding road transmitted from the service provider is displayed in a superimposed form. In this case, information is also displayed in a superimposed form for each relevant section of the road, showing that the road is jammed with traffic, traffic is flowing even though congested, or the road is under construction, for example.

In the case of safe drive diagnostic service, based on the vehicle information collected as shown in FIG. 32, assessment is made to evaluate the degree of driving safety for each driver from the change in vehicle speed and angle of direction, and insurance discount rate calculated based on this value is displayed. Further, the items of driving safety are graphically represented on this screen, and precautions for driving are displayed to encourage driving safety.

In the case of vehicle trouble diagnostic service, based on the vehicle information collected as shown in FIG. 33, assessment is made to evaluate the conditions of the vehicle, and the relevant possible troubles, their degree of danger and difficulty of repair are displayed in a correlated form. Items of a particularly high degree of danger are displayed in highlighted video to prompt urgent repair by the driver.

In the phase of service charges shown in FIG. 4, the carrier of communication 50 calculates the communications fee for each member on a periodic basis (e.g. every month) (190), and the communications fee is notified to the information center 40 (192). The information center 40 checks the fee notified by the carrier of communication 50, against the communications history of vehicle information (194).

The information center 40 calculates, for each member, the expenses required to process information, for example, to create the history of vehicle information 72 including the communications fee (195), and notifies the result to the service provider 30 (196). The service provider 30 checks the expenses notified by the information center 40, against the history of information process (197). The service provider 30 calculates the information value 741 from the registered vehicle information specification 70 (198).

Service charges for each member, including the expenses notified by the information center 40 are calculated based on this information value 741 (199). The service provider 200 bills the service member 9 for service charges (200). The service member 9 pays service charges to the service provider 30 through a financial institution (201). The service provider 30 pays the expenses from the service charges to the information center 40 (202). The information center 40 pays the communications fee to the carrier of communication 50 from the expenses (204).

Figure 8:
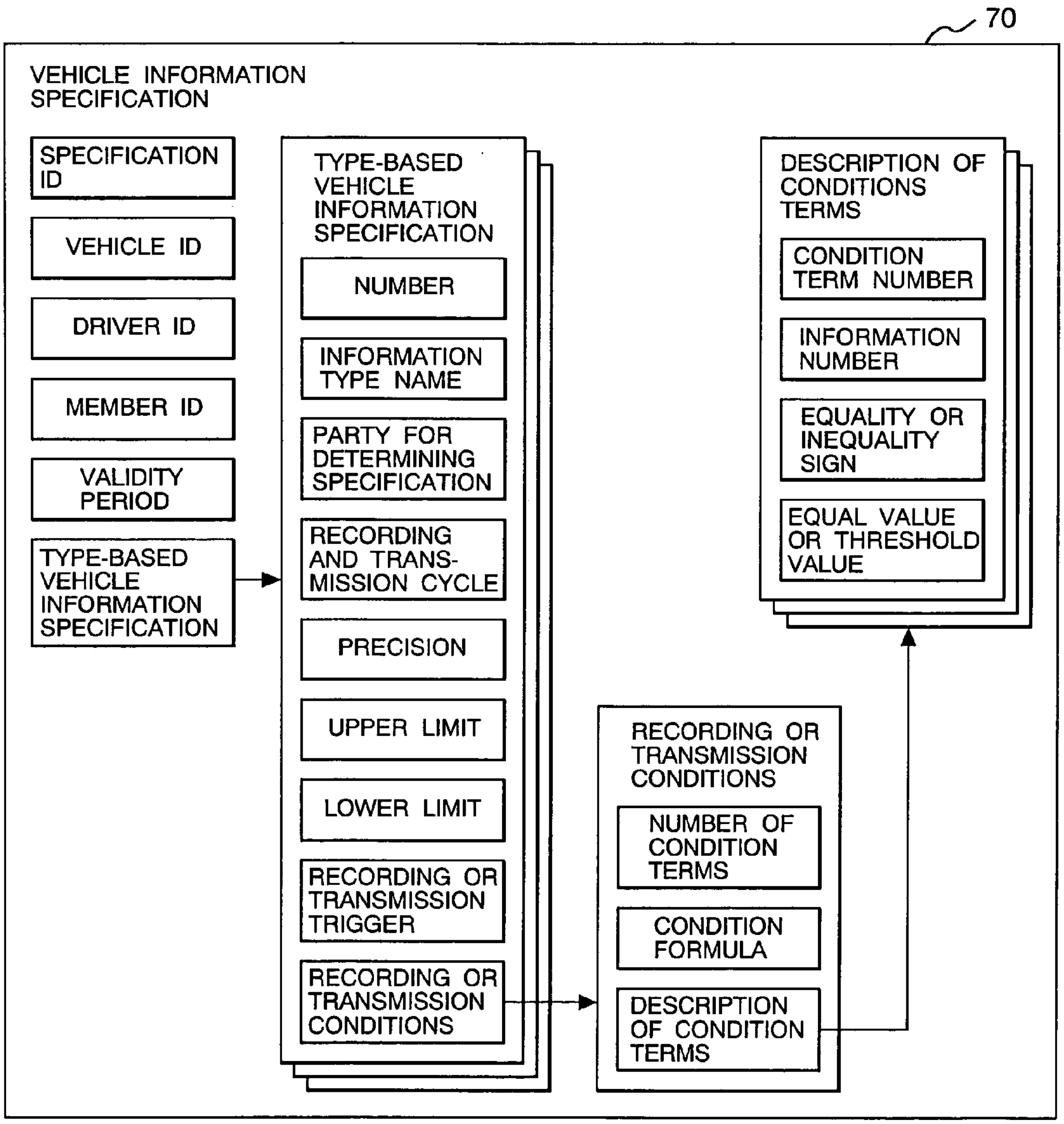
FIG. 8 is a diagram representing the configuration of vehicle information specification.

FIG. 8 is a diagram representing the configuration of a vehicle information specification 70. Each driver 10 is assumed to keep one vehicle information specification 70 for the validity period. The vehicle information specification 70 consists of a specification ID as a specification number, a vehicle ID used by the driver 10, a membership ID for certifying the service membership designating the driver 10, a drive ID for the service member to identify the drive 10, a validity period of the service and a type-based vehicle information specification as a specification in one type of information. The type-based vehicle information specification consists of vehicle information number, vehicle information type name, name of the person having determined the vehicle information specification, cycle of recording and transmission, precision, upper and lower limits, trigger type for activating the processing of recording and transmission, and recording or sending conditions for showing conditions for recording and transmission. The recording and transmission conditions representing conditions for recording and transmission are condition formulae having some condition terms, and comprise the number of condition terms, condition formulas showing the relationship among condition terms, equality or inequality sign showing the relationship of evaluation among condition terms, and setting values such as equal value or threshold value in evaluation. These condition terms represent the degree of magnitude with respect to setting or the range specification. They are used, for example, to specify the range close to the home or the time zone for vehicle information.

Figure 9:
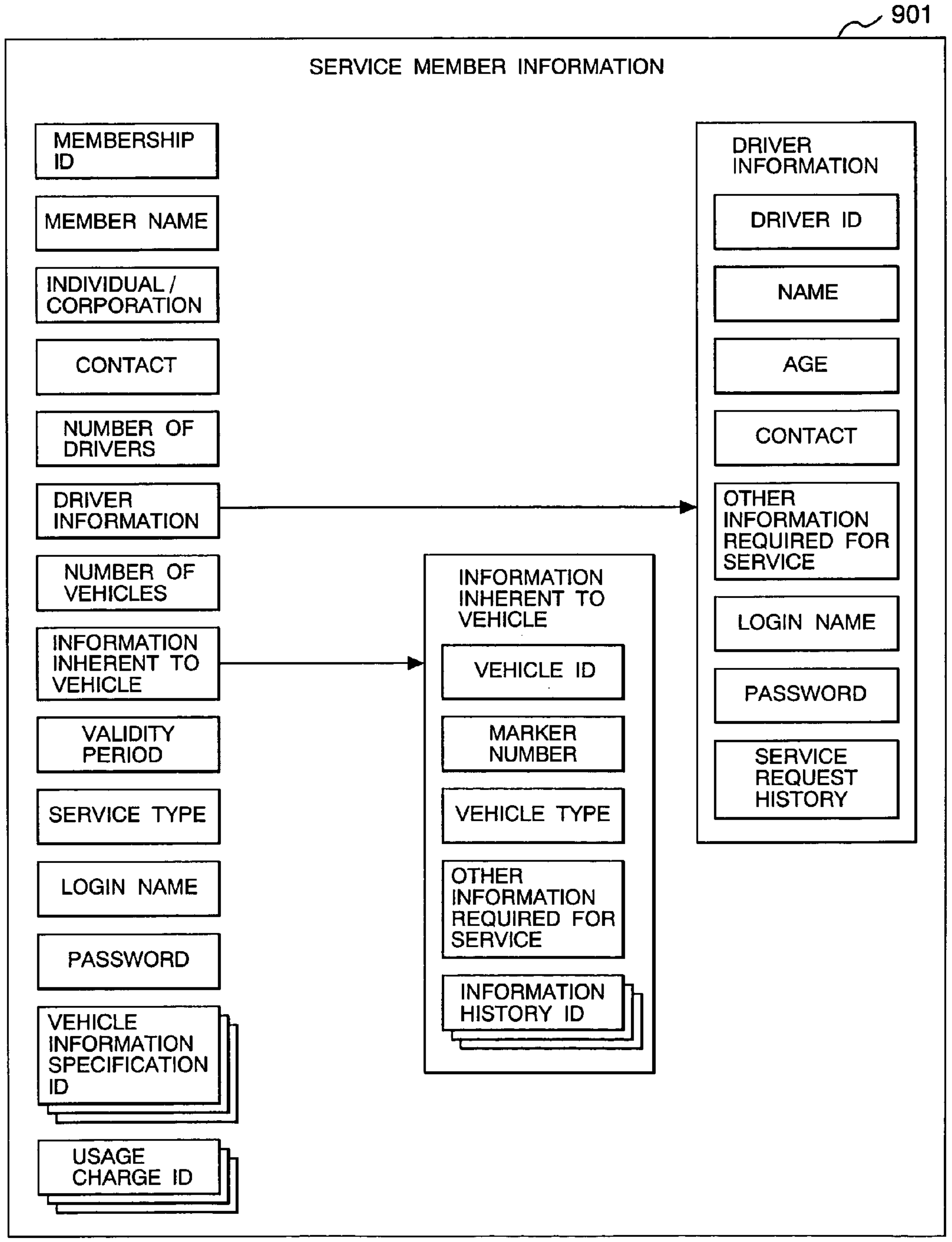
FIG. 9 is a diagram representing the configuration of service member information.

FIG. 9 is a diagram representing the configuration of the information of service members 901. One piece of information on service members is assumed for each service member 9 during the validity period. Information on service member comprises a membership ID, a name, an individual/corporation information for showing whether the contract is based on an individual or a corporation, contact information including address and telephone number, the number of drivers as the number of drivers 10 specified by the service member 9, multiple pieces of driver information representing the information on driver 10, the number of vehicles representing the number of vehicles specified d by the service member 9, information inherent to the vehicle representing the information on vehicle 20 related to traveling, validity period showing the period where the service remains valid, traffic information, service type showing the type of service 73 such as safe driving diagnosis, login name and password for identifying a service member, vehicle information specification ID representing the number of vehicle information specification 70 registered by the service member 9, and usage charge ID representing the number of information on usage charge.

Driver information consists of the driver ID representing the number of driver 10, name, age, contact information including address and telephone number, the login name and password for the system to identify the driver, a service request history ID as a number of service request history, and other information required for services. The information inherent to the vehicle includes vehicle ID, marker number, vehicle type, information history ID representing the number of the history of vehicle information 72, and other information required for services.

Figure 10:
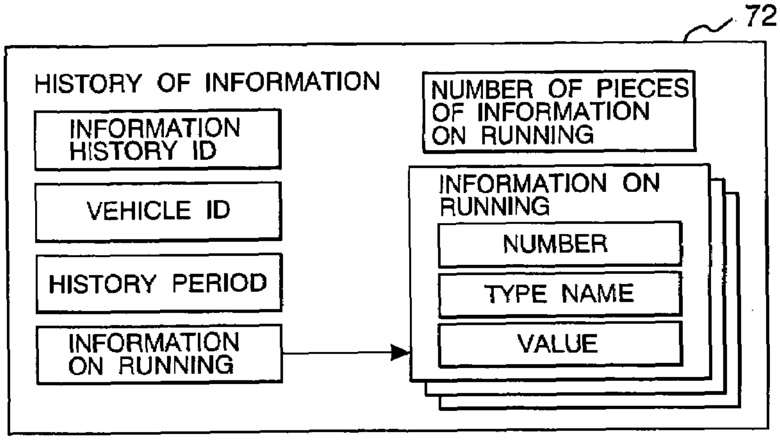
FIG. 10 is a diagram representing the configuration of the history of vehicle information 72.

FIG. 10 is a diagram representing the configuration of the history of vehicle information 72. One piece of the history of vehicle information 72 is to be retained for each trip. In principle, one trip is defined as traveling of a vehicle from starting to stopping of the engine. However, when the engine is stopped halfway to take a rest in the case of a long-haul driver, it is possible to use one traveling route determined in advance. In the case of the driver of a delivery and transport company, one collection/delivery route may be used as one trip.

The history of vehicle information 72 consists of information history ID, vehicle ID for the vehicle 20 having traveled, history period shown in the history of information, number of pieces of the history of information, and history of information. The history of information consists of its number, type name of information and its value.

Figure 11:
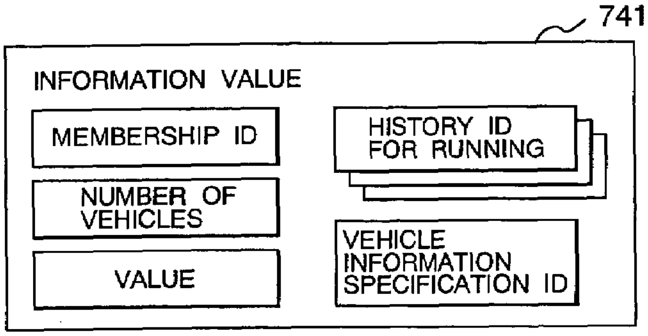
FIG. 11 is a diagram representing the configuration of information value.

FIG. 11 is a diagram representing the configuration of information value 741. The information value 741 consists of the member ID of the service member 9 as a recipient of services, the number of vehicles specified by the service member 9, the information history ID for identifying the history of vehicle information 72 on vehicle 20, the ID of vehicle information specification 70 specified by the service member 9 and the information value of vehicle information specification 70.

Figure 12:
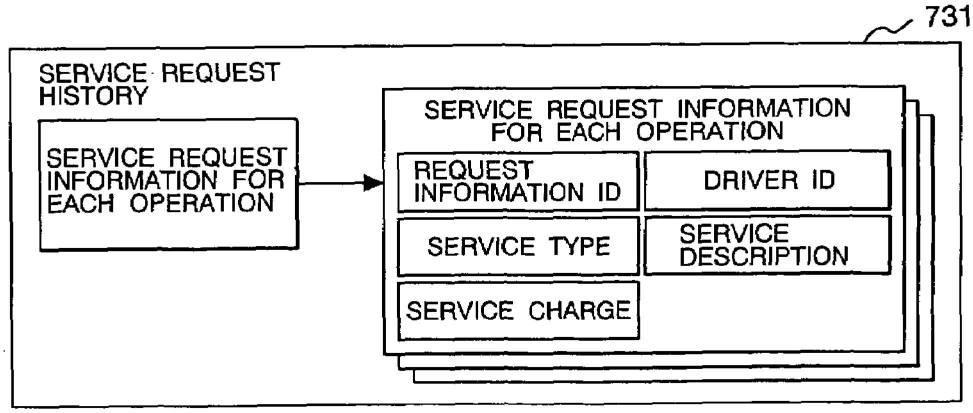
FIG. 12 is a diagram representing the configuration of a service request history.

FIG. 12 is a diagram representing the configuration of a service request history 731. The service request history 731 occurs when services are employed. One service request history consists of the number of pieces of information on the request of services by driver 10. The service request information for each use comprises a request information ID of request information, the ID of the driver having requested the service, the type of services and service charges.

Figure 16:
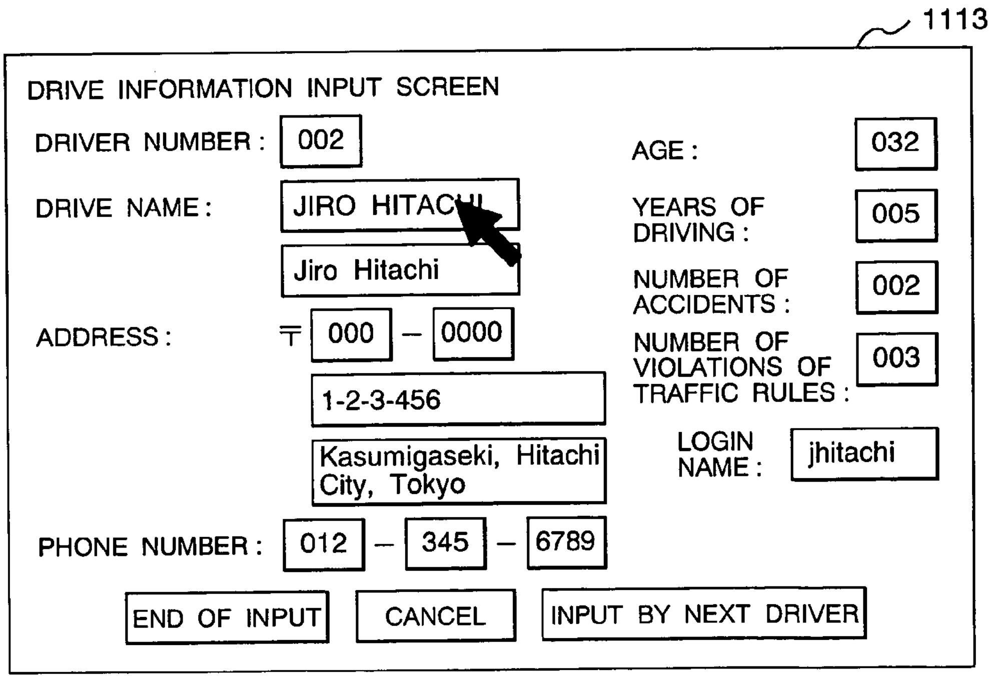
FIG. 16 is a driver information input screen.

Upon receipt of application for membership from the service member 9, the service provider 30 sends an application format to apply for service membership to the service member 9. This application form allows a service membership input screen 1111 to be displayed, and the service membership information 901 is inputted. In this case, a driver information input button is displayed on the service membership input screen 1111. When this button is pressed, the driver information input screen 1113 is displayed as shown in FIG. 16.

Figure 17:
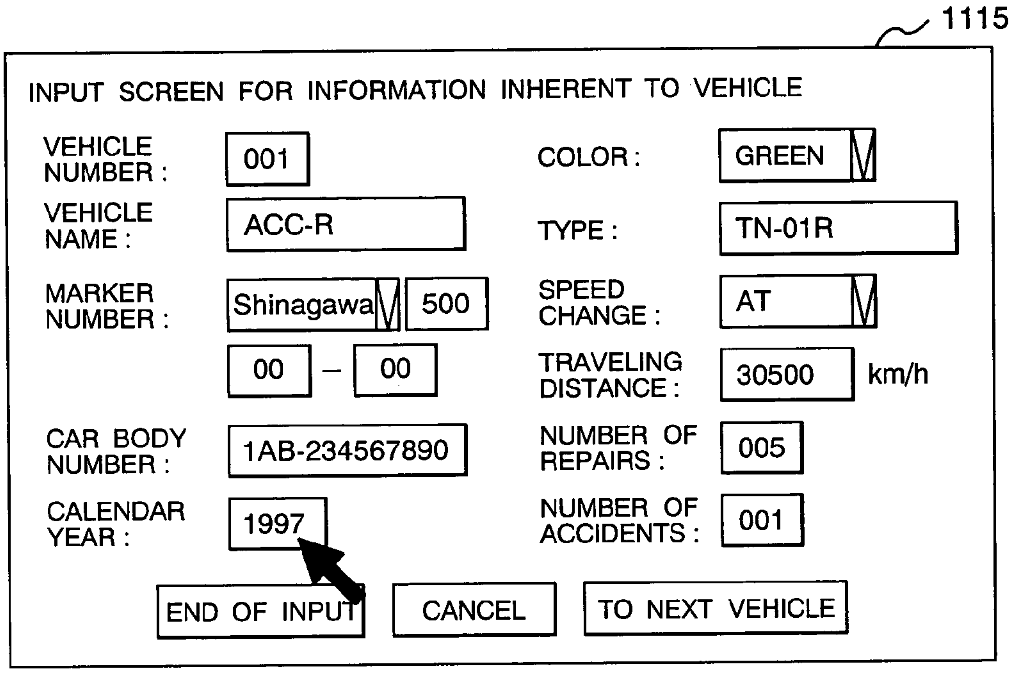
FIG. 17 is an input screen for information inherent to vehicle.
Figure 18:
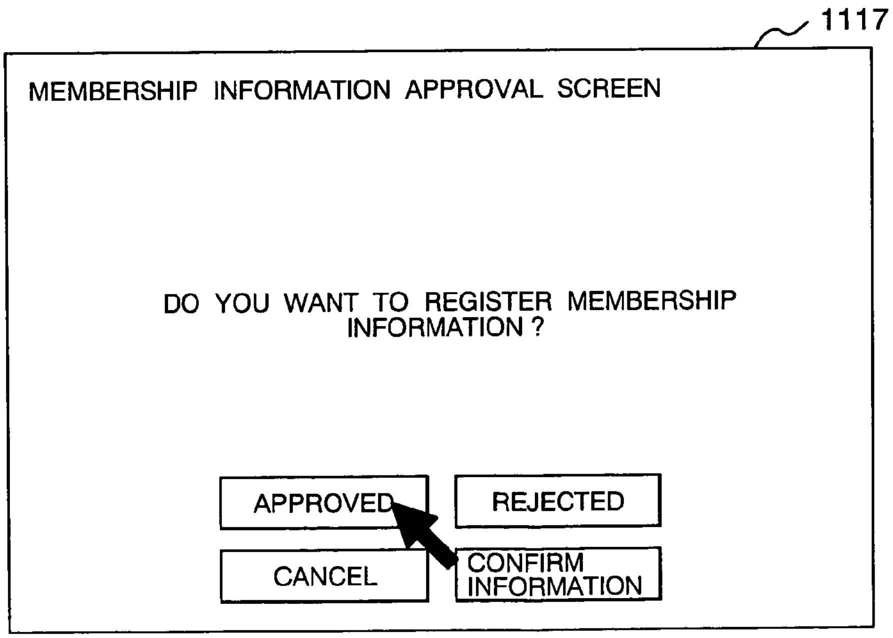
FIG. 18 is a membership information approval screen.

Drive information is inputted on this driver information input screen 1113. An input button for information inherent to the vehicle is displayed on the service membership input screen 1111. When this button is pressed, an input screen 1115 for information inherent to the vehicle as shown in FIG. 17 is displayed.

The information inherent to the vehicle is inputted on the input screen 1115 for information inherent to the vehicle (1114). When the OK button of the service member information input screen 1111 is pressed after service membership information 901 has been inputted, the service membership information approval screen 1117 appears. The system asks if registration is required or not. If the service member has pressed the Approval button (1116), membership registration information is transmitted to the service provider 30.

Figure 13:
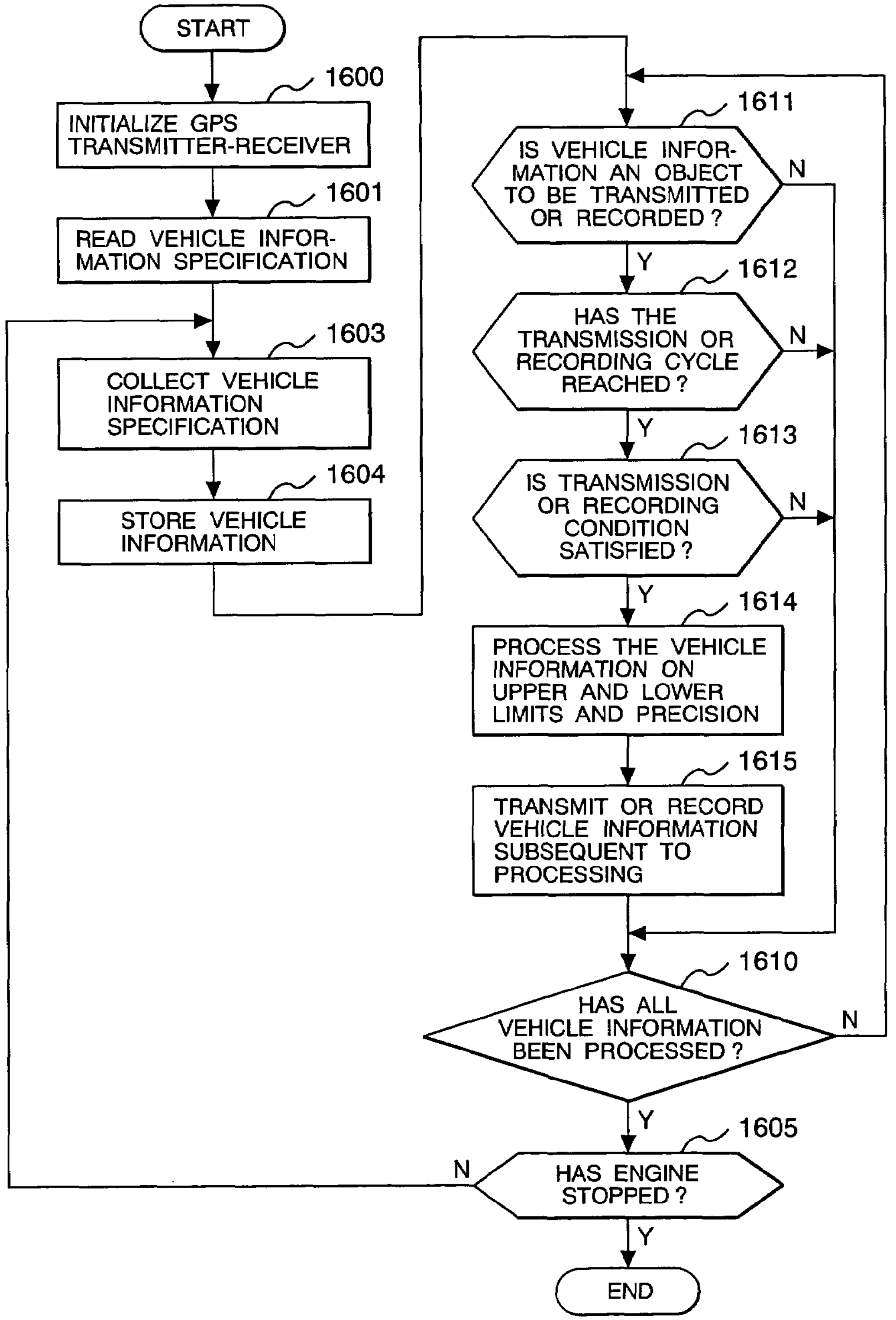
FIG. 13 is a flow chart representing the processing of collecting and storing vehicle information.

FIG. 13 is a flow chart representing the processing of collecting and storing vehicle information in the on-board terminal 21. It corresponds to the processing from the periodic collection/storage 160 of vehicle information of the processing flow shown in FIG. 3 to periodic vehicle information transmission 161.

In the first place, the on-board terminal 21 initializes the GPS receiver 213 and transmitter-receiver 215 (1600). Then the system reads the vehicle information specification 70 stored in the information recorder 217 (1600). For all the types of vehicle information 71 that can be collected, vehicle information 71 is collected from various sensors 212 or GPS receivers 213 (1603), and is stored into the storage device of the CPU 210 (1604). For all types of vehicle information 71, evaluation is made from the vehicle information specification 70 to see if the vehicle information 71 is to be transmitted or recorded or not (1611).

If it is to be transmitted or recorded, the counted time is equal to the transmission cycle or recording cycle described in the vehicle information specification 70 (1612); and if the transmitting or recording condition has been satisfied (1613), processing of upper/lower limits and precision of the value of vehicle information 71 is carried out.

The processing of the upper limit can be defined as the step wherein, if the value of vehicle information 71 has exceeded the upper limit, that value is replaced by the upper limit itself. The processing of the lower limit can be defined as the step wherein, if the value of vehicle information 71 has exceeded the lower limit, that value is replaced by the lower limit itself.

The processing of precision can be defined as the step of processing the value of vehicle information 71 into that based on the unit of precision. To put it more specifically, vehicle information 71 is divided by precision, and its integral value is multiplied by precision to be replaced by that value. Upon termination of processing 1614, the vehicle information 71 is transmitted to the information center 40 or recorded on the recording medium (1615). The above processing is repeated for all types of vehicle information 71. After that, if the engine is turned off (1616), processing is terminated. Otherwise, a series of processing is repeated, starting from processing 1603.

Figure 14:
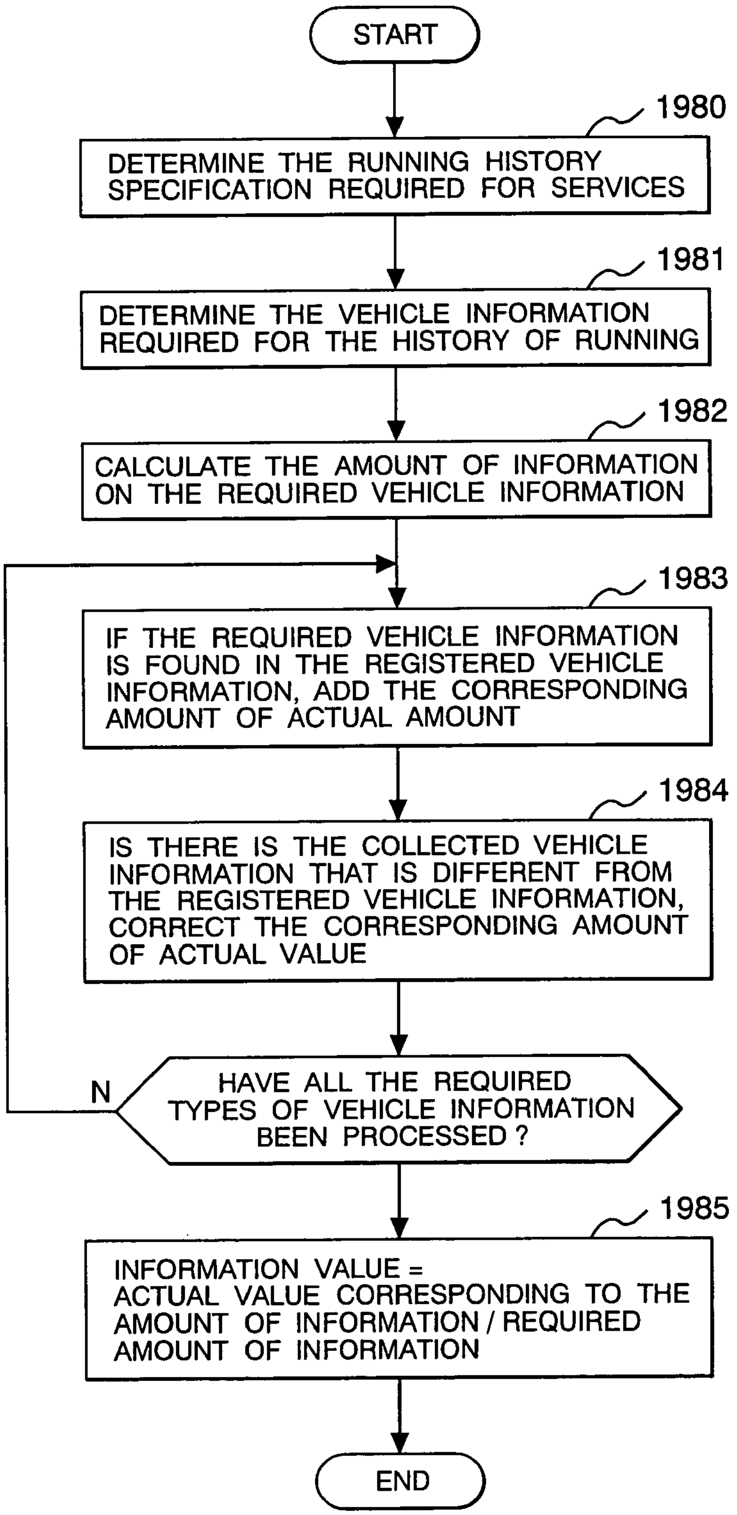
FIG. 14 is a flowchart representing the processing of calculating information value.
Figure 15:
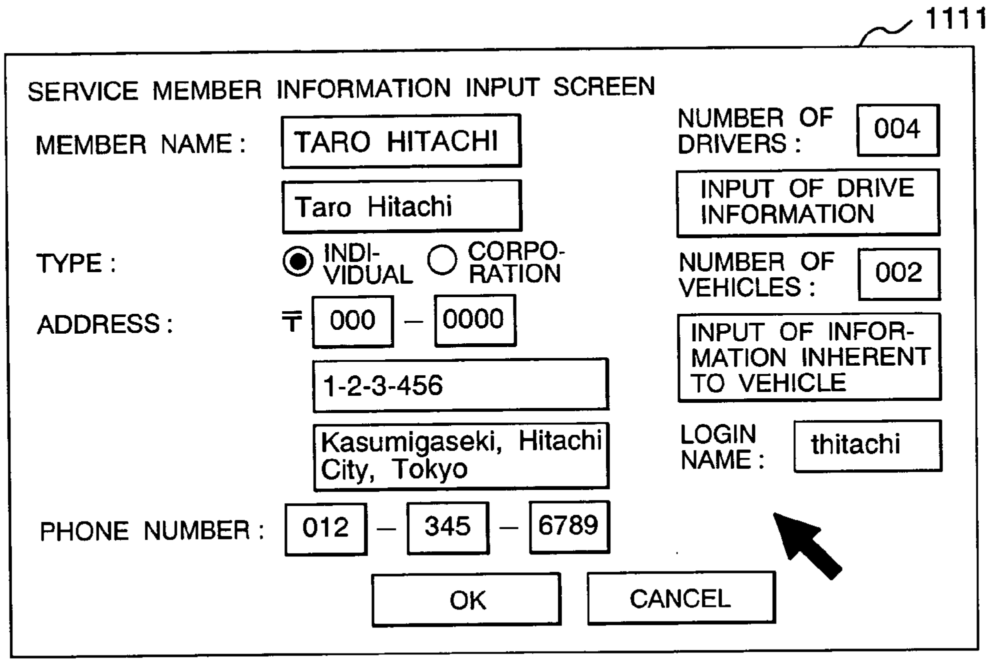
FIG. 15 is a service member information input screen.

FIG. 14 is a flowchart representing the processing of calculating information value in a service provider 30, with respect to calculation of information value. The service provider 30 takes preliminary action of determining the vehicle information specification required to get the history of information. In the first place, the service provider 30 calculates the amount of information in vehicle information specification (1982).

The system calculates the actual value for the amount of information in the registered vehicle information specification (1983). To simplify the calculation of the actual value for the amount of collected information, it is possible to use the number of bytes of the received information. Further, the actual value for the amount of information is corrected from the collected vehicle information (1984).

Even if the specification of the vehicle information is the same, there is a difference in the degree of contribution to realizing the service 73, as exemplified by vehicle speeds at different time zones. Correction of this difference is taken into account. For one type of vehicle information specified by the vehicle information specification 70 in this case, if the required vehicle information is found in the registered vehicle information, the amount corresponding to that information is added to the actual value for the amount of information (1983). Further, the actual value for the amount of information is corrected from the collected vehicle information (1984).

Even if the specification of the vehicle information is the same, there is a difference in the degree of contribution to realizing the service 73, as exemplified by vehicle speeds at different time zones. Accordingly, such factors must be taken into account in the step of correction. Processing 1983 and 1984 is repeated for all types of vehicle information specified by the vehicle information specification 70. In the final phase, the actual value for the amount of information having been corrected is divided by the amount of required information, thereby calculating the information value (1985). The maximum level of the value is determined to ensure that the actual value for the amount of information does not exceed 1.

Further, if the information required for the service supplied to the user is not transmitted from the user, the service charge can be increased for that user in such a way as to cover the expenses for service management.

Reference signs in the drawings show the following parts.

1, 11: PC, 2, 12: Potable terminal, 9: Service member, 10: Driver, 20: Vehicle, 21: On-board terminal, 30: Service provider, 31: Man/machined interface, 32, 42: CPU, 33, 441: Service member information database, 34: Database of history of vehicles information while vehicles are running, 35, 446: Database of history of information process, 36: Information value database, 40: Information center, 43: Transmitter-receiver, 50: Carrier of communication, 70: Vehicle information specification, 72: History of information, 210: CPU on on-board terminal, 211: I/O of on-board terminal, 212: Various sensors, 213: GPS receiver, 214: GPS antenna, 215: Radio transmitter-receiver, 216: Radio antenna, 217: Information recorder

218: Operation input equipment, 219: Display, 442: Database of vehicle information specification, 443: Database of vehicle information, 444: Database of service contents, 445: Database of history of transmission/reception, 447: Database on history of service requests, 731: Service request history.

The present invention allows the driver to determine if the history of information is exposed to public eyes or not. This ensures vehicle information to be collected, with consideration given to driver privacy. Further, service charges or insurance premium can be determined in response to the settings of vehicle information specification.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle information collection system in which vehicle information collected by a unit mounted on a vehicle is transmitted to an information center which provides a service making use of the vehicle information, wherein the unit mounted on the vehicle comprises:

communication means for receiving from said information center a plurality of items of vehicle information specification according to said service to be provided;

operation input means for inputting a plurality of selected items of the vehicle information specification to be selected from among the plurality of items of the vehicle information specification received from said information center;

means for storing the selected items of the vehicle information specification inputted; and means for storing the vehicle information relating to conditions of the vehicle, based on said selected items of the vehicle information specification, wherein said transmission means transmits the stored vehicle information to said information center.

2. The vehicle information collection system according to claim 1, wherein a time period during which the vehicle information collected by the unit mounted on the vehicle is transmitted is determined either by an operation of direction means provided with the vehicle mounted unit or by the vehicle's having reached a point which meets a predetermined condition.

3. The vehicle information collection system according to claim 2, wherein when the selected specification of the vehicle information has been selected, charges or discount rates thereof are displayed at the vehicle mounted unit and the charges or the discount rates thereof are adjusted according to setting operation of the selected specification of the vehicle.

4. A vehicle mounted unit for collecting vehicle information to be transmitted to a provider for providing a service based on the collected vehicle information, said vehicle mounted unit comprising:

communication means for receiving from said information center a plurality of items of vehicle information specification according to the service to be provided;

display means for displaying said plurality of items of vehicle information specification received;

operation input means for inputting a plurality of selected items of the vehicle information specification to be selected among the plurality of items of the vehicle information specification received from said information center;

storing means for storing the selected items of the vehicle information specification inputted; and recording means for recording vehicle information relating to conditions of a vehicle mounting said unit, based on said stored selected items of the vehicle information specification;

wherein said transmission means transmits the recorded vehicle information to said information center.

5. The vehicle mounted unit according to claim 4, further comprising operation means for indicating a time period during which the vehicle information collected by the vehicle mounted unit is transmitted, wherein said recording means records the vehicle information based on an indication from said operation means.

6. A vehicle information collection method for a vehicle having a unit mounted on the vehicle for collecting vehicle information to be transmitted to an information center for providing a service based on the collected vehicle information, the vehicle information collecting method comprising:

receiving at said vehicle mounted unit a plurality of items of vehicle information specification dependent on the service to be provided;

storing at said vehicle mounted unit a plurality of selected items of the vehicle information specification to be selected among the plurality of items of the vehicle information specification received from said information center;

storing vehicle information relating a condition of the vehicle based on the selected items of the vehicle information specification; and transmitting the stored vehicle information to said information center.

7. The vehicle information collection method according to claim 6, wherein:

charges or discount rates thereof are displayed at said vehicle mounted unit upon selection of the specification of the vehicle information; and the charges or the discount rates are adjusted according to a setting operation of the selected specification.

* * * * *

UNITED STATES PATENT AND TRADEMARK OFFICE

CERTIFICATE OF CORRECTION

PATENT NO. : 7,155,322 B2 
APPLICATION NO. : 10/668312
DATED : September 24, 2003
INVENTOR(S) : Takashi Nakahara et al.

It is certified that error appears in the above-identified patent and that said Letters Patent is hereby corrected as shown below:

On the title page item (75) Takumi Rushiki, Hitachi (JP)

Signed and Sealed this

Third Day of April, 2007

JON W. DUDAS
*Director of the United States Patent and Trademark Office*

UNITED STATES PATENT AND TRADEMARK OFFICE

CERTIFICATE OF CORRECTION

PATENT NO. : 7,155,322 B2
APPLICATION NO. : 10/668312
DATED : December 26, 2006
INVENTOR(S) : Takashi Nakahara et al.

It is certified that error appears in the above-identified patent and that said Letters Patent is hereby corrected as shown below:

On the title page item (75) Takumi Rushiki, Hitachi (JP)

This certificate supersedes Certificate of Correction issued April 3, 2007.

Signed and Sealed this

Eighth Day of May, 2007

JON W. DUDAS
*Director of the United States Patent and Trademark Office*

UNITED STATES PATENT AND TRADEMARK OFFICE

CERTIFICATE OF CORRECTION

PATENT NO. : 7,155,322 B2
APPLICATION NO. : 10/668312
DATED : December 26, 2006
INVENTOR(S) : Takashi Nakahara et al.

It is certified that error appears in the above-identified patent and that said Letters Patent is hereby corrected as shown below:

On the title page item (75) “Takumi Tushiki, Hitachi (JP)” should read --Takumi Fushiki, Hitachi (JP)--

This certificate supersedes Certificates of Correction issued April 3, 2007 and May 8, 2007.

Signed and Sealed this

Third Day of July, 2007

JON W. DUDAS
*Director of the United States Patent and Trademark Office*